US012731121B2

(12) United States Patent
Wiklof et al.

(10) Patent No.: US 12,731,121 B2
(45) Date of Patent: Sep. 8, 2026

(54) COMPUTER METHOD AND APPARATUS FOR PROVIDING PROPRIETARY RIGHTS TRANSACTIONS

(71) Applicant: Abaxx Technologies Corp., Christ Church (BB)

(72) Inventors: Christopher A. Wiklof, Everett, WA (US); Timothy M. Londergan, Seattle, WA (US); Nobuhito Koya, Tokyo (JP); Nicholas Gibson, Tokyo (JP); Geoffery D. Osler, Seattle, WA (US); James N. Harmon, Seattle, WA (US)

(73) Assignee: ABAXX TECHNOLOGY CORP., Christ Church (BB)

( * ) Notice: Subject to any disclaimer, the term of this patent is extended or adjusted under 35 U.S.C. 154(b) by 91 days.

(21) Appl. No.: 18/605,689

(22) Filed: Mar. 14, 2024

(65) Prior Publication Data

US 2024/0303620 A1 Sep. 12, 2024

Related U.S. Application Data

(60) Division of application No. 17/147,261, filed on Jan. 12, 2021, now abandoned, which is a (Continued)

(51) Int. Cl.
*G06Q 20/12* (2012.01)
*G06Q 20/06* (2012.01)
(Continued)

(52) U.S. Cl.
CPC ..... *G06Q 20/1235* (2013.01); *G06Q 20/0655* (2013.01); *G06Q 20/3678* (2013.01); (Continued)

(58) Field of Classification Search
CPC ........... G06Q 20/1235; G06Q 20/0655; G06Q 20/3678; G06Q 20/38215; G06Q 20/401; G06Q 2220/00
(Continued)

(56) References Cited

U.S. PATENT DOCUMENTS 11,334,882 B1 * 5/2022 Jameson ............... H04L 9/3231
2016/0092988 A1 3/2016 Letourneau
(Continued)

FOREIGN PATENT DOCUMENTS

WO 2017/145007 A1 8/2017

OTHER PUBLICATIONS

International Search Report and Written Opinion, dated Dec. 18, 2019, issued in International Application No. PCT/US2019/041554, 25 pgs.

*Primary Examiner* — Courtney P Jones
(74) *Attorney, Agent, or Firm* — Panitch Schwarze Belisario & Nadel LLP

(57) ABSTRACT

A computer method for distributing a cost of enforcing a proprietary rights asset. The computer method includes presenting at least summary information about a proprietary rights asset on an electronic display; offering, on the electronic display, at least fractional ownership of the proprietary rights asset in the form of a proprietary rights asset blockchain token; displaying an allocation of funds received in exchange for the proprietary rights asset blockchain token, including an allocation for future enforcement of proprietary rights corresponding to the proprietary rights asset on the electronic display; receiving an order to exchange a cryptographic currency value for the proprietary rights asset blockchain token; performing the exchange; and transferring the allocated funds to an enforcement account.

14 Claims, 25 Drawing Sheets

Related U.S. Application Data continuation-in-part of application No. PCT/US2019/041554, filed on Jul. 12, 2019.

(60) Provisional application No. 62/792,697, filed on Jan. 15, 2019, provisional application No. 62/724,570, filed on Aug. 29, 2018, provisional application No. 62/714,310, filed on Aug. 3, 2018, provisional application No. 62/701,091, filed on Jul. 20, 2018, provisional application No. 62/701,102, filed on Jul. 20, 2018, provisional application No. 62/697,108, filed on Jul. 12, 2018.

(51) Int. Cl.

*G06Q 20/36* (2012.01)
*G06Q 20/38* (2012.01)
*G06Q 20/40* (2012.01)

(52) U.S. Cl.

CPC ..... *G06Q 20/38215* (2013.01); *G06Q 20/401* (2013.01); *G06Q 2220/00* (2013.01)

(58) Field of Classification Search

USPC .......................................................... 705/59
See application file for complete search history.

(56) References Cited

U.S. PATENT DOCUMENTS

| | | | |
|---|---|---|---|
| 2017/0024818 A1 | 1/2017 | Wager et al. | |
| 2017/0116608 A1* | 4/2017 | Forzley | G06Q 20/4014 |
| 2017/0178236 A1* | 6/2017 | Saigh | G06Q 40/04 |
| 2017/0230375 A1 | 8/2017 | Kurian | |
| 2017/0337534 A1 | 11/2017 | Goeringer et al. | |
| 2018/0089761 A1 | 3/2018 | Stradling et al. | |
| 2018/0139042 A1 | 5/2018 | Binning et al. | |
| 2018/0211318 A1 | 7/2018 | Parikh et al. | |
| 2019/0005595 A1* | 1/2019 | Tautenhan | G06Q 50/184 |
| 2019/0164151 A1* | 5/2019 | Doney | H04L 9/50 |
| 2019/0220836 A1 | 7/2019 | Caldwell | |
| 2019/0318348 A1 | 10/2019 | Brenner et al. | |
| 2019/0340607 A1* | 11/2019 | Lynn | G06Q 20/4014 |
| 2020/0143367 A1 | 5/2020 | LeBeau et al. | |

* cited by examiner

TRANSMIT A REQUEST FOR A TRANSACTION THAT INCLUDES VIEWING THE IMAGE OF DOCUMENT CORRESPONDING TO A PROPRIETARY RIGHTS ASSET TO A PLURALITY OF BLOCKCHAIN NODES

1702

RECEIVE VERIFICATION FROM AT LEAST A PORTION OF THE NODES THAT THE DOCUMENT CORRESPONDING TO THE PROPRIETARY RIGHTS ASSET IS A VALID PORTION OF A TRANSACTION

1704

CONVERTING PROPRIETARY RIGHTS ASSET BLOCKCHAIN TOKENS TO PROPRIETARY RIGHTS LICENSES

COMPUTER METHOD AND APPARATUS FOR PROVIDING PROPRIETARY RIGHTS TRANSACTIONS

CROSS REFERENCE TO RELATED APPLICATIONS

The present application is a Divisional of co-pending U.S. patent application Ser. No. 17/147,261, entitled "COMPUTER METHOD AND APPARATUS FOR PROVIDING PROPRIETARY RIGHTS TRANSACTIONS," filed Jan. 12, 2021. U.S. patent application Ser. No. 17/147,261 is a Continuation-in-Part that claims priority benefit from co-pending PCT Application Np. PCT/US2019/041554, entitled "COMPUTER METHOD AND APPARATUS FOR PROVIDING INTELLECTUAL PROPERTY TRANSACTIONS", filed Jul. 12, 2019. PCT Application No. PCT/US2019/041554 claims priority benefit from U.S. Provisional Patent Application No. 62/714,310, entitled "METHOD FOR OBTAINING A LICENSE TO A PROPRIETARY RIGHT," filed Aug. 3, 2018, from U.S. Provisional Patent Application No. 62/701,091, entitled "GRAPHICAL USER INTERFACE AND SYSTEM FOR TRANSFERRING DIVERSE INTELLECTUAL PROPERTYASSET FRACTIONAL VALUE," filed Jul. 20, 2018, from U.S. Provisional Patent Application No. 62/792,697, entitled "PATENT TRADING EXCHANGE BASED ON BLOCKCHAIN," filed Jan. 15, 2019, from U.S. Provisional Patent Application No. 62/724,570, entitled "UI AND SYSTEM FOR SECURELY IDENTIFYING A USER REGISTERED ON A BLOCKCHAIN EXCHANGE," filed Aug. 29, 2018, from U.S. Provisional Patent Application No. 62/701,102, entitled "FIAT CURRENCY ENFORCEMENT ALLOCATION," filed Jul. 20, 2018, and from U.S. Provisional Patent Application No. 62/697,108, entitled "COMPUTER METHOD FOR PRESENTING INFORMATION ABOUT AN INTELLECTUAL PROPERTY ASSET," filed Jul. 12, 2018.

Each of the foregoing applications, to the extent not inconsistent with the disclosure herein, is incorporated by reference in its entirety.

SUMMARY

According to an embodiment, a computer method for secure transfer of a blockchain token representing an interest in a proprietary rights asset includes displaying at least summary information corresponding to a proprietary rights asset to a user on an electronic display according to a user interface. The computer method includes receiving, from the user via the user interface, an order to exchange a first quantity of cryptographic currency held by the user at a user wallet memory address for a second quantity of proprietary rights asset tokens, each representing at least a fractional interest in the proprietary rights asset. The computer method includes writing data corresponding to a pending transfer of the second quantity of proprietary rights asset tokens to the user wallet address and receiving data corresponding to the first quantity of cryptographic currency into a transaction wallet memory address.

According to an embodiment, a computer method for obtaining a license to a proprietary right includes disclosing identity and related information via a graphical user interface (GUI) on an electronic device networked to a server computer and obtaining a specified number of proprietary rights asset blockchain tokens, each proprietary rights asset token representing a fractional interest in a proprietary right, by swapping a cryptographic currency value for the proprietary rights asset tokens via the GUI. The computer method may include disclosing an intent to take a license via the GUI and entering, via the GUI, an agreement to license terms. The computer method may include swapping, via the GUI, the specified number of proprietary rights asset tokens for one or more proprietary rights license tokens that carry a contract granting a right to engage in an activity that infringes the proprietary right. For example, he issued proprietary rights asset tokens and/or proprietary rights license tokens may carry a contract (e.g., a smart contract) corresponding to a binding contract, such as an assignment of rights, via the plurality of proprietary rights asset tokens, to a subsequently identified party or parties.

According to an embodiment, the computer method for obtaining the license to a proprietary right may further include entering information related to a product or service via the GUI and receiving a listing of proprietary rights assets related to the product or service and recommended for license.

According to an embodiment, a computer method for transferring a proprietary rights asset fractional value includes presenting a plurality of groups of proprietary rights assets as icons in a graphical user interface (GUI), and receiving a graphical selection of a particular proprietary rights asset from a user via the GUI. The computer method includes swapping a cryptographic currency value from a user wallet for a corresponding proprietary rights asset token value from an exchange wallet, and making an indication of a change in proprietary rights asset balance in the user wallet via the GUI.

According to an embodiment, a computer method for controlling access to a proprietary rights asset includes receiving a selection of a proprietary rights asset via a user interface and reading one or more user credentials from account information corresponding to the user or from a non-fungible token representing the user. The computer method includes reading one or more credentials requirements from a data source corresponding to the proprietary rights asset and comparing the user credentials to the credentials requirements. The computer method also includes displaying, via the user interface, detailed information about the proprietary rights asset only if the user credentials meet the credentials requirements.

In an embodiment, a proprietary rights asset token includes a fiat currency allocation to fund enforcement of proprietary rights (e.g., intellectual property rights) associated with a proprietary rights asset represented by the proprietary rights asset token. The proprietary rights asset token may include a blockchain token and/or a distributed ledger token. As used herein, the terms blockchain and distributed ledger may be considered synonymous, unless context dictates otherwise.

According to an embodiment, a computer method for distributing a cost of enforcing a proprietary rights asset may include presenting at least summary information about the proprietary rights asset on an electronic display, offering at least fractional ownership of the proprietary rights asset in the form of a proprietary rights asset blockchain token, and displaying an allocation of funds received in exchange for the proprietary rights asset blockchain token. The allocation may include an allocation for possible future enforcement of proprietary rights corresponding to the proprietary rights asset. The computer method may further include receiving an order to exchange a cryptographic currency value for the proprietary rights asset blockchain token, performing the exchange, and transferring the allocated funds to an enforcement account. In an embodiment, the enforcement account is held in a fiat currency corresponding to a country in which the proprietary rights asset is enforceable. In an embodiment, fiat currency balances are represented in the proprietary rights asset blockchain token. In an embodiment, unused enforcement funds may be withdrawn from the fiat accounts and credited to proprietary rights asset token holders, such as upon accumulation of the tokens by a single or small group of owners, or upon expiration of a proprietary rights asset expiration.

According to an embodiment, a computer method for maintaining an allocation of funds for enforcing a proprietary rights asset includes establishing a target amount of enforcement funding across a population of proprietary rights asset blockchain tokens representing one or more proprietary rights assets. A fractional portion of the enforcement funding is allocated to each proprietary rights asset blockchain token. Enforcement funding corresponding to each proprietary rights asset token or population of proprietary rights asset tokens may be displayed in a graphical user interface (GUI). A verified request may be received from a user via the GUI to swap a cryptographic currency for a proprietary rights asset blockchain token, and the swap made. The computer method may further include displaying the user cryptographic currency and proprietary rights asset blockchain token balance in the GUI. The computer method may include determining if the net number of sold proprietary rights asset blockchain tokens has changed, adjusting the amount of enforcement funding in an enforcement escrow account for the population to compensate for any change in the net number of sold proprietary rights asset blockchain tokens, and displaying an actual escrow account balance per token or population of tokens in the GUI. In an embodiment, the proprietary rights asset blockchain token may be a non-fungible token. In another embodiment, the proprietary rights asset blockchain token may be a non-fungible token having a value set according to an exchange rate to a fungible token. In an embodiment, a proprietary rights asset token may have a portion of its value determined by a value of a corresponding proprietary rights asset and another portion of its value being pegged to one or more underlying fiat currencies. In an embodiment, a non-fungible proprietary rights asset blockchain token may be traded for a fungible value token, such as a cryptographic currency or an exchange token, according to an exchange rate set according to trading history, issuer option, and/or relative demand.

According to an embodiment, a computer method for presenting information about a proprietary rights asset includes presenting at least one proprietary rights asset to a user via a graphical user interface (GUI) on an electronic display, receiving a selection of the at least one proprietary rights asset from the user via the GUI, decrypting a blockchain transaction data structure to obtain an image of a document defining the proprietary rights asset, and presenting the image of the document to the user via the GUI.

According to an embodiment, a computer method for presenting information about a proprietary rights asset further includes presenting a field for entry of a digital key via the GUI and receiving the digital key from the user via the GUI. Decrypting a blockchain transaction data structure includes decrypting the blockchain data structure using the digital key.

According to an embodiment, a computer method for supporting an proprietary rights transaction includes receiving, into a server computer via a first graphical user interface displayed on an end device, a designation of a group comprising a plurality of proprietary rights assets. Each proprietary rights asset represents a particular right from a class of rights represented by the plurality of proprietary rights assets. The computer method includes issuing a plurality of proprietary rights asset blockchain tokens representing the plurality of proprietary rights assets. Each of the plurality of proprietary rights asset blockchain tokens represents a fractional portion of at least an economic interest in the plurality of proprietary rights assets. In an embodiment, each of the plurality of proprietary rights asset blockchain tokens represents a fractional portion of ownership of the plurality of proprietary rights assets. The computer method includes displaying a graphical representation of at least a portion of the plurality of proprietary rights asset blockchain tokens on at least one end user device as a second graphical user interface, and receiving a buy order from a first know your customer (KYC)—compliant user via the second graphical user interface displayed on a second end device. The buy order corresponds to a transfer of at least a fractional portion of the plurality of offered proprietary rights asset blockchain tokens for an agreed-upon value of a first cryptographic currency. The computer method includes transferring the fractional portion of the plurality of proprietary rights asset blockchain tokens from a transaction wallet to a buyer wallet held by the KYC-compliant user, and transferring the agreed-upon value of the first cryptographic currency from the buyer wallet into the transaction wallet. According to embodiments the buy order may alternatively be received from, and the fractional portion of the plurality of proprietary rights asset blockchain tokens may be transferred to a buyer wallet corresponding to an anonymous counterparty. In an embodiment the computer method may include establishing KYC-compliant accounts and representing the KYC-compliant party and/or counterparty in an anonymous for to the other of the counterparty and/or party. In an embodiment, information is transferred between parties as tokens (e.g., that act substantially as bearer bonds), wherein party and/or counterparty identity is encrypted in corresponding tokens.

According to an embodiment, a computer method for issuing a proprietary rights asset blockchain token representing at least one proprietary rights asset includes receiving, into a server computer, a designation of at least one proprietary rights asset owned by a person or an enterprise and presenting an proprietary rights asset attribute graphical user interface to a user holding agency for the person or the enterprise. The proprietary rights asset attribute graphical user interface includes a field for receiving information (i.e., the information including one or more attributes) related to the proprietary rights asset. The computer method includes receiving into the server computer, via the proprietary rights asset attribute graphical user interface, one or more attributes of the at least one proprietary rights asset, and receiving a binding contract from the user to convert at least a portion of an economic interest in the proprietary rights asset to a quantity of proprietary rights asset tokens. The computer method includes determining the quantity of proprietary rights asset tokens to issue corresponding to the proprietary rights asset, and issuing the quantity of proprietary rights asset tokens. The issued proprietary rights asset tokens may carry a smart contract corresponding to a binding contract and the attributes of the at least one proprietary rights asset.

According to an embodiment, a system includes at least one processor and at least one memory coupled to the at least one processor and having instructions stored therein which, when executed by any set of the one or more processors, perform a process. The process includes displaying at least summary information corresponding to a proprietary rights asset to a user on an electronic display according to a user interface, and receiving, from the user via the user interface, an order to exchange a first quantity of cryptographic currency held by the user at a user wallet memory address for a second quantity of proprietary rights asset tokens, each representing at least a fractional interest in the proprietary rights asset. The process also includes writing data corresponding to a pending transfer of the second quantity of proprietary rights asset tokens to the user wallet memory address, and receiving data corresponding to the first quantity of cryptographic currency into a transaction wallet memory address.

According to an embodiment, a computer method includes displaying at least summary information corresponding to a proprietary rights asset to a first user on an electronic display according to a user interface, and receiving, from the first user via the user interface, an order to exchange a first quantity of cryptographic currency held by the first user for a second quantity of proprietary rights asset tokens held by a second user and representing at least a fractional interest in the proprietary rights asset. The computer method also includes transferring the first quantity of cryptographic currency to the second user, transferring the second quantity of proprietary rights asset tokens to the first user, and recording the transfer of the second quantity of cryptographic currency in one or more blockchain transactions.

DETAILED DESCRIPTION

Figure 1:
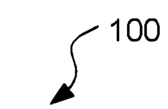
FIG. 1 is a flow chart showing a computer method for secure transfer of a blockchain token representing an interest in a proprietary rights asset, according to an embodiment.
Figure 1:
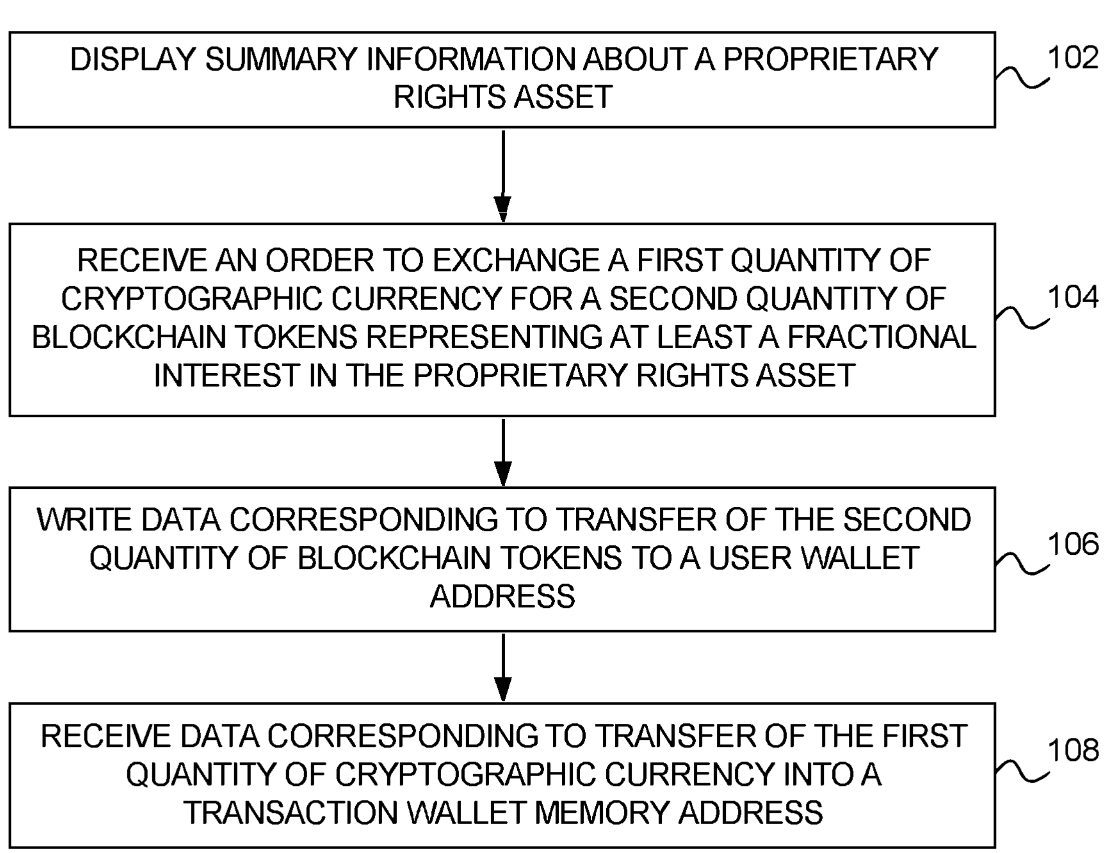

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

FIG. 1 is a flow chart showing a computer method 100 for secure transfer of a blockchain token representing an interest in a proprietary rights asset, according to an embodiment. The computer method 100 may include several steps.

According to an embodiment, step 102 may include displaying at least summary information corresponding to a proprietary rights asset to a user on an electronic display according to a user interface. The at least summary information corresponding to the proprietary rights asset, as used here and as referenced throughout this disclosure, may include one or more of an identifier, a title, a description, a country granting proprietary rights in the asset, current and/or prior owner information, identification of one or more creators of the proprietary rights asset, one or more valuations of the proprietary rights asset, one or more dates related to term and/or expiration of the proprietary rights asset, a drawing related to the proprietary rights asset, and/or an identifier of a related proprietary rights asset. The summary information may include license information such as current licensee(s), types and/or terms of licenses, and/or availability of licenses. The summary information may in an embodiment identify a type of the proprietary rights asset, e.g., patent, trademark, copyright, industrial design, mask work, or the like, a pending application for any of these, and/or a trade secret. The summary information may in an embodiment identify a chain of title in the proprietary rights asset.

According to an embodiment, step 104 may include receiving, from the user via the user interface, an order to exchange a first quantity of cryptographic currency held by the user at a user wallet address for a second quantity of proprietary rights asset tokens representing at least a fractional interest in the proprietary rights asset.

Those having skill in the art will recognize that "user wallet address" is typically a data string, such as an alphanumeric code, that is generated to receive transactions and transmit transactions. The user wallet address may be generated from a public key. The public key is derivable from a private key known to a party having ownership of the wallet (or alternatively, from a private key that is held in custody of the wallet), but the private key cannot be derived from the public key, owing to use of a hyperbolic function that is a "one-way" function. The contents (and authority for transferring the contents) of a wallet address are accessible by the party holding the private key.

According to an embodiment, step 106 may include writing data corresponding to a pending transfer of the second quantity of proprietary rights asset tokens to the user wallet address.

According to an embodiment, step 108 may include receiving data corresponding to the first quantity of cryptographic currency into a transaction wallet memory address.

Figure 2:
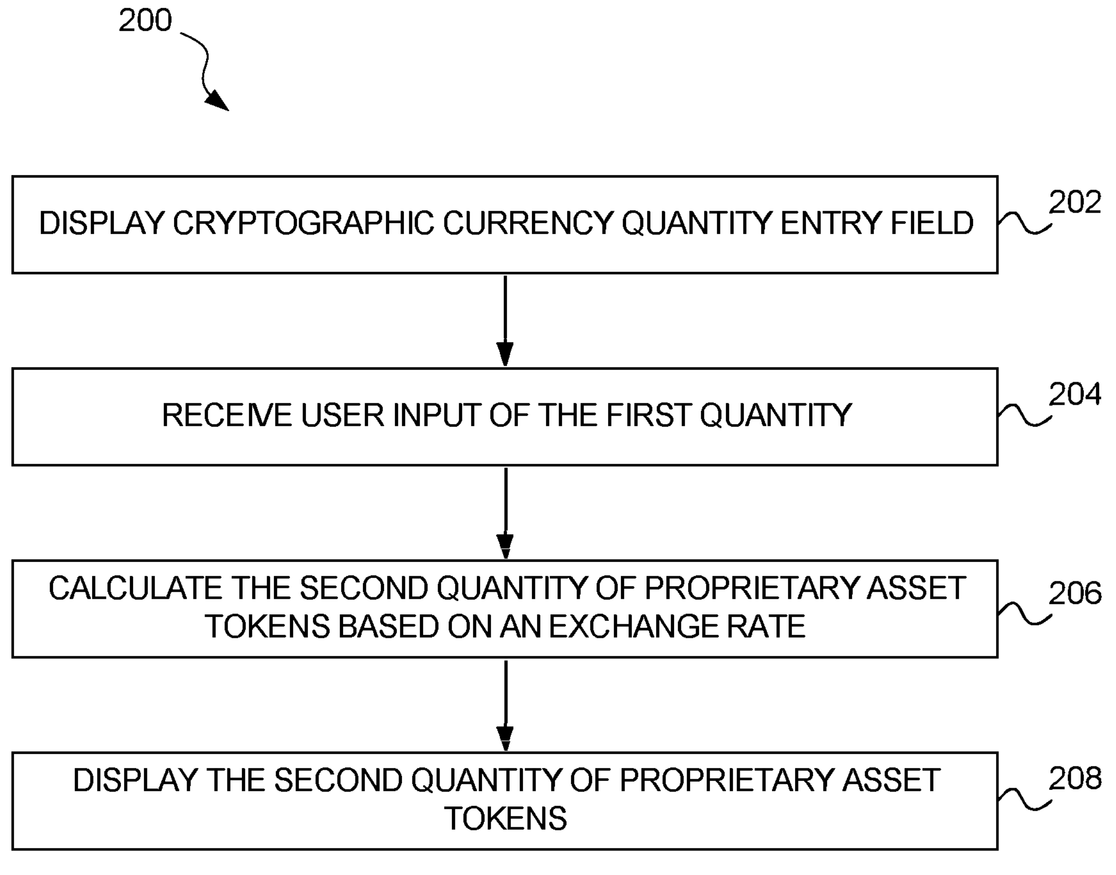
FIG. 2 is a flow chart showing a computer method for displaying a quantity of blockchain tokens representing a proprietary rights asset corresponding to a selected amount of a cryptographic currency as a function of an exchange rate, according to an embodiment.

FIG. 2 is a flow chart showing a computer method 200 for displaying a quantity of blockchain tokens representing a proprietary rights asset corresponding to a selected amount of a cryptographic currency as a function of an exchange rate, according to an embodiment.

According to an embodiment, step 202 may include displaying a field for the user to enter the first quantity of cryptographic currency.

According to an embodiment, step 204 may include receiving user input of the first quantity of cryptographic currency.

According to an embodiment, step 206 may include calculating the second quantity of proprietary rights asset tokens based on an exchange rate.

According to an embodiment, step 208 may include displaying the second quantity of proprietary rights asset tokens According to an embodiment, with reference to step 206, the computer method 200 may include calculating the exchange rate based on relative supply and demand of the cryptographic currency and the proprietary rights asset tokens. Additionally or alternatively, the computer method 200 may include calculating the exchange rate based on a supply and demand of the cryptographic currency and a specified price of the proprietary rights asset tokens.

Figure 3:
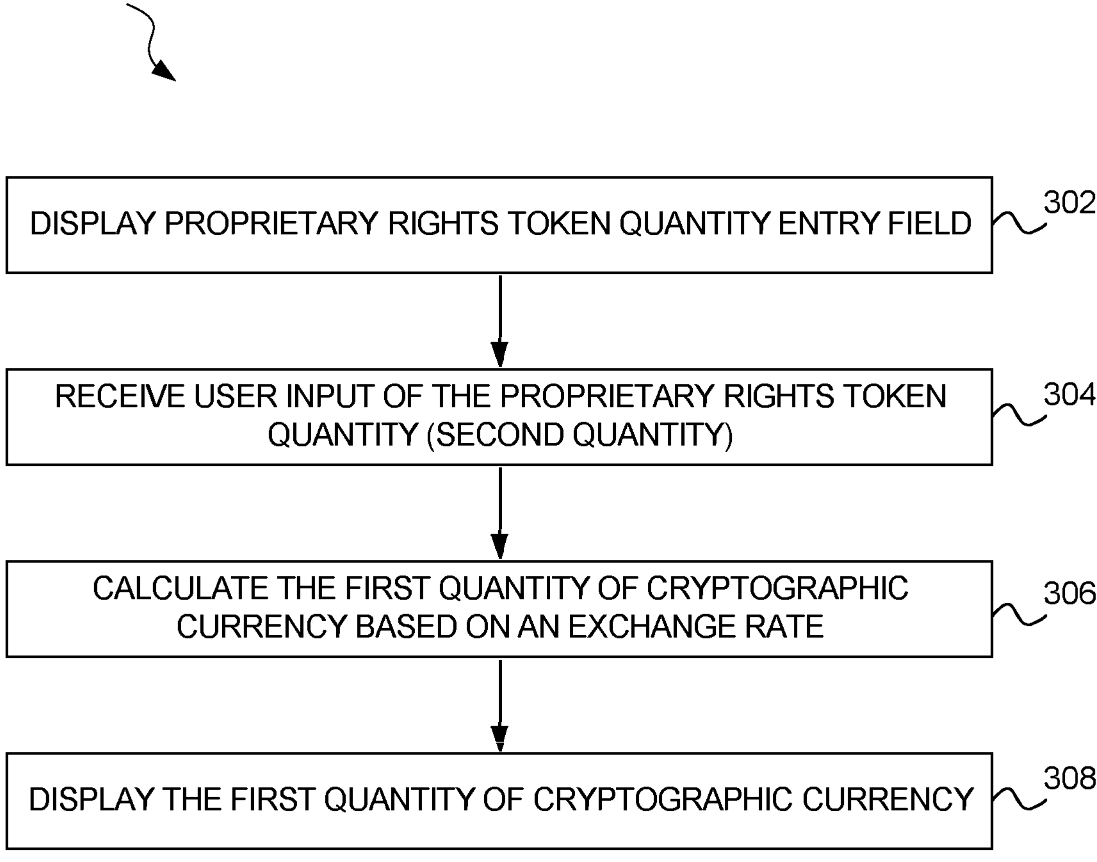
FIG. 3 is a flow chart showing a computer method for displaying a quantity of a cryptographic currency corresponding to a selected amount of blockchain tokens representing a proprietary rights asset as a function of an exchange rate, according to an embodiment.

FIG. 3 is a flow chart showing a computer method 300 for displaying a quantity of a cryptographic currency corresponding to a selected amount of blockchain tokens representing a proprietary rights asset as a function of an exchange rate, according to an embodiment.

Displaying at least summary information about the proprietary rights asset from step 102 of FIG. 1 may include several steps. According to an embodiment, step 302 may include displaying a field for the user to enter the second quantity of proprietary rights asset tokens.

According to an embodiment, step 304 may include receiving user input of the second quantity.

According to an embodiment, step 306 may include calculating the first quantity of cryptographic currency based on an exchange rate.

According to an embodiment, step 308 may include displaying the first quantity of cryptographic currency.

Figure 4:
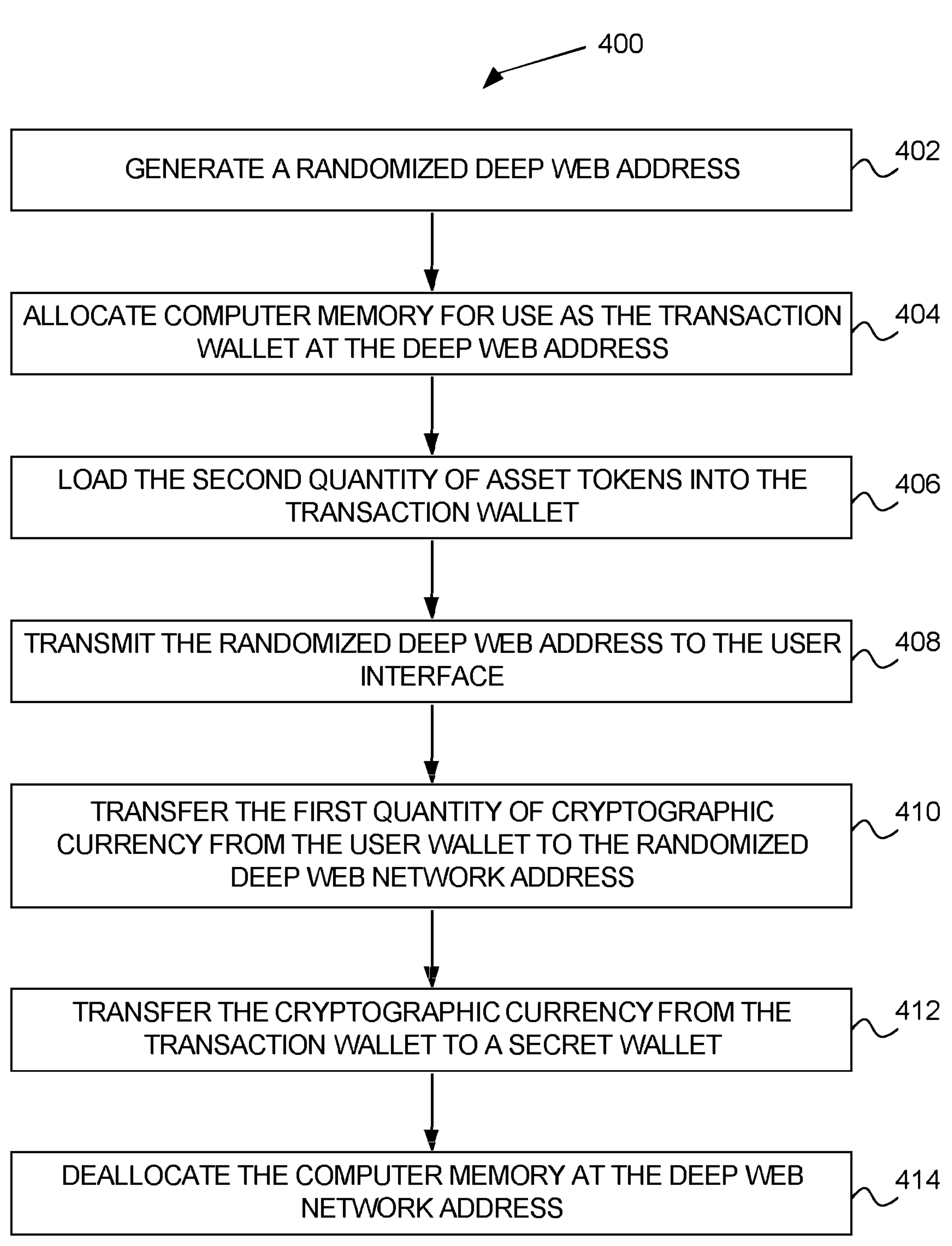
FIG. 4 is a flow chart showing a computer method for exchanging a cryptographic currency for blockchain tokens representing a proprietary rights asset, according to an embodiment.

FIG. 4 is a flow chart showing a computer method 400 for exchanging a cryptographic currency for blockchain tokens representing a proprietary rights asset, according to an embodiment.

According to an embodiment, displaying at least summary information about the proprietary rights asset from step 102 of FIG. 1 may include displaying a field for the user to enter a committed bid price of the proprietary rights asset tokens. Receiving the order to exchange the first quantity of cryptographic currency for the second quantity of proprietary rights asset tokens from step 104 of FIG. 1 may include receiving the committed bid price, according to an embodiment. The smart contract may include the commitment to sell at least a portion of the proprietary rights asset tokens at the committed bid price, according to an embodiment. Additionally or alternatively, displaying at least summary information about a proprietary rights asset from step 102 of FIG. 1 may include displaying a committed selling price. The smart contract may include the commitment to sell at least a portion of the proprietary rights asset tokens at the committed selling price, according to another embodiment.

According to an embodiment, step 402 may include generating a random or pseudorandom (randomized) deep web address for an instance of the transaction wallet. For example, step 402 may include generating a new public key not previously associated with a blockchain transaction or generating a new private key and deriving a new public key from the new private key not previously associated with a blockchain transaction.

According to an embodiment, step 404 may include allocating computer memory corresponding to the transaction wallet having the randomized deep web address.

According to an embodiment, step 406 may include loading, from a secret address, the second quantity of proprietary rights asset tokens into the transaction wallet.

According to an embodiment, step 408 may include transmitting the randomized deep web address to the user interface.

Generally speaking, a Deep Web network address is a network location that cannot be or is impractical to be indexed by web search engines.

According to an embodiment, a Deep Web network address may include a first portion that is indexed by and/or linked from a surface web location accessible by conventional web search engines, and a second portion that is unpredictable and sufficiently long to substantially prevent systematic search. The Deep Web network address may thus be non-indexed and non-linked. The Deep Web network address may be uncrawlable. According to an embodiment, the Deep Web network address does not require registration or login. In an alternative embodiment, the Deep Web network address may be a contextual address, such as an address configured to be accessible to query by devices having a predetermined URL access history. The Deep Web network address may be generated by a JavaScript or other randomizing or pseudo-randomizing application. According to an embodiment, the Deep Web network address may include a Uniform Resource Identifier (URI) including a URL that is indexed and, associated with the URL, a non-indexed query including a passcode that is generated by a random number or pseudo-random number generator and which provides a path to the proposal.

According to an embodiment, step 410 may include transferring the first quantity of cryptographic currency from the user wallet to the randomized deep web address According to an embodiment, step 412 may include transferring the cryptographic currency from the transaction wallet to a secret wallet.

According to an embodiment, step 414 may include deallocating the computer memory at the deep web network address According to an embodiment, the cryptographic currency may include value carried by a public blockchain. Additionally or alternatively, the cryptographic currency may include at least one transaction history verifiable by the public blockchain. The cryptographic currency may include fungible value. The cryptographic currency may include at least one transaction history carried by a permissioned blockchain.

According to an embodiment, referring to FIG. 1, the computer method 100 may include fulfilling a smart contract to validate the proprietary rights asset tokens.

Referring to FIG. 1, in step 104, at least a fractional interest in the proprietary rights asset may include at least fractional ownership of the proprietary rights asset, according to an embodiment. Additionally or alternatively, at least a fractional interest in the proprietary rights asset may include at least fractional rights to a revenue stream from the proprietary rights asset.

Referring to FIG. 1, in step 102, the proprietary rights asset may include a patent. Additionally or alternatively, the proprietary rights asset may include a standards-essential patent. The proprietary rights asset may include a patent application. The proprietary rights asset may include an invention. The proprietary rights asset may include a trademark. The proprietary rights asset may include a copyright. The proprietary rights asset may include an industrial design. The proprietary rights asset may include a mask work.

Figure 5:
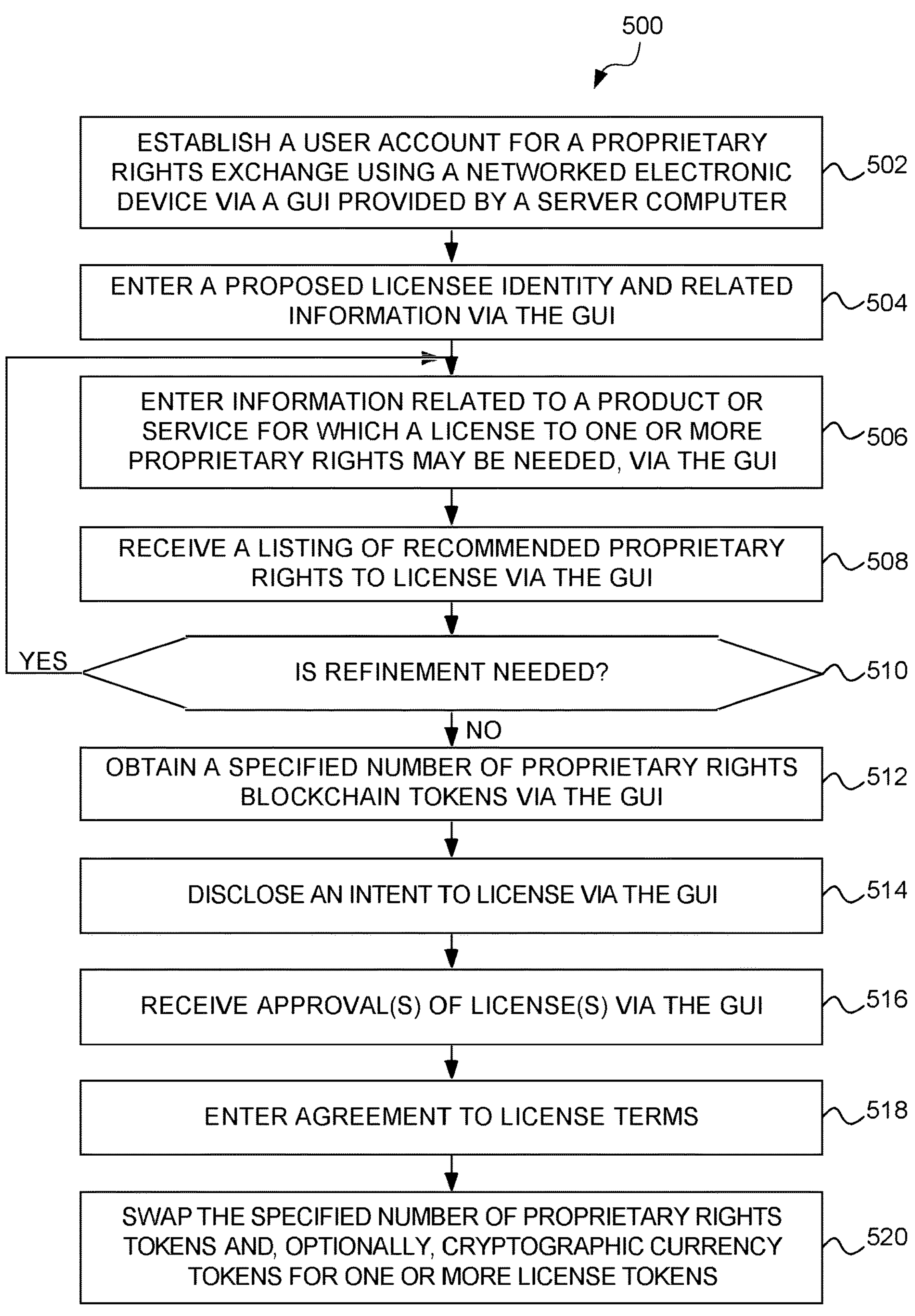
FIG. 5 is a flow chart showing a computer method for receiving a license to a proprietary right, according to an embodiment.

FIG. 5 is a flow chart showing a computer method 500 for receiving a license to a proprietary right.

According to an embodiment, the computer method 500 for obtaining a license to a proprietary right includes, in step 504, disclosing identity and related information via a graphical user interface (GUI) on an electronic device networked to a server computer. Step 512 includes obtaining a specified number of blockchain proprietary rights asset tokens, each token representing a fractional interest in a proprietary right, by swapping a cryptographic currency value for the proprietary rights asset tokens via the GUI. Step 514 includes disclosing an intent to receive a license via the GUI. Step 518 includes entering, via the GUI, an agreement to license terms. Step 520 includes swapping, via the GUI, the specified number of proprietary rights asset tokens for one or more license tokens. In an embodiment, the license token carries a contract granting a right to engage in an activity that infringes the proprietary right.

According to an embodiment, the computer method 500 includes, in step 502, establishing a user account with an intellectual property exchange, using the GUI.

In an embodiment, swapping the proprietary rights asset tokens for one or more license tokens, in step 512, causes the license tokens to be burned. In another embodiment, swapping the proprietary rights asset tokens for one or more license tokens, in step 512, causes the license tokens to be recycled into a pool available for purchase.

In an embodiment, the specified number of proprietary rights asset tokens, obtained in step 504, is constant. In an embodiment, the specified number of proprietary rights asset tokens, obtained in step 504, is variable. In an embodiment, the specified number of proprietary rights asset tokens, obtained in step 504, is a function of a number of the proprietary rights asset tokens, corresponding to a particular proprietary right, in circulation. In an embodiment, the specified number of proprietary rights asset tokens is a function of the identity of the proposed licensee. For example, a lister of a patent may require a larger number of tokens from a known competitor. In an embodiment, the specified number of proprietary rights asset tokens is a function of projected annual sales of covered products and/or services by the proposed licensee. In an embodiment, the specified number of proprietary rights asset tokens is a function of a size of the proposed licensee. In an embodiment, the specified number of proprietary rights asset tokens is a function of a territory of the proposed licensee. In an embodiment, the specified number of proprietary rights asset tokens is a function of a state of technology developed by the proposed licensee. In an embodiment, the specified number of proprietary rights asset tokens is a function of a territory allowed under the license. In an embodiment, the specified number of proprietary rights asset tokens is a function of a territory excluded under the license. In an embodiment, the specified number of proprietary rights asset tokens is a function of a duration of the license. In an embodiment, the specified number of proprietary rights asset tokens is a function of a limitation to experimental use. In an embodiment, the specified number of proprietary rights asset tokens is a function of a production quantity covered under the license. In an embodiment, the specified number of proprietary rights asset tokens is a function of other considerations to be paid for the license or related agreement.

According to an embodiment, the computer method 500 includes, in step 516, receiving an approval of the proposed license via the GUI. In an embodiment, obtaining a specified number of proprietary rights asset tokens representing a fractional interest in a proprietary right, in step 504, further includes obtaining a specified number of proprietary rights asset tokens representing fractional interests in a plurality of respective proprietary rights. In this way, a proprietary rights exchange may offer bundled proprietary rights packages. In an embodiment, each one of a plurality of obtained proprietary rights asset tokens represents an interest in one proprietary right. In another embodiment, one or more of the obtained proprietary rights asset tokens represent an interest in a plurality of proprietary rights.

In an embodiment, swapping the specified number of proprietary rights asset tokens for one or more license tokens, in step 520, further includes paying in a specified number of cryptographic currency tokens for the one or more license tokens.

According to an embodiment, the computer method 500 for obtaining a license to a proprietary right includes, in step 506, entering information related to a product or service to be covered by the license via the GUI. In response to receipt of the information related to the product or service, a server computer may assemble a list of relevant proprietary rights assets available for license according to the respective description of each. For example, the list may be assembled using Bayesian logic or Boolean logic based on comparing terminology (including synonyms) and relationships between terms in the product or service description to terminology and relationships between terms in descriptions of a population of available proprietary rights assets. The approach may be similar to performing a search combined with sorting for relevance. In step 508, the computer method 500 may include receiving a listing of proprietary rights related to the product or service and recommended for license.

According to an embodiment, the computer method 500 includes, in step 510, determining that further refinement in the product or service description is desirable to reduce extraneous recommended listings. The computer method 500 may include repeating the steps of entering product or service information, shown in step 506, and receiving a refined listing of proprietary rights recommended for license.

In various embodiments, the proprietary right token may correspond to a patent or patent application, or may correspond to a trademark. In other embodiments, the proprietary right token may correspond to a distributorship, a right to resell, and/or to a franchise.

Figure 6:
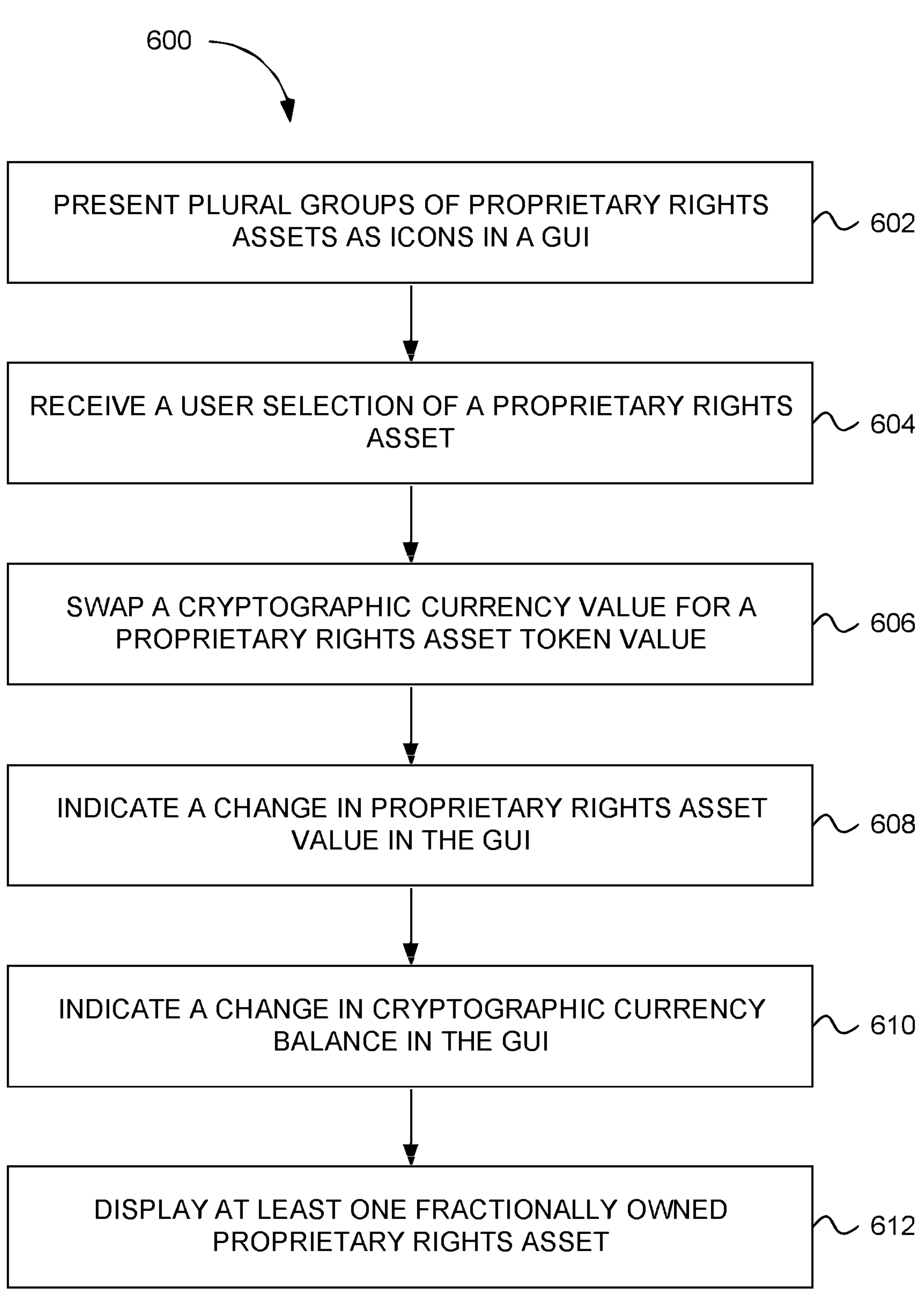
FIG. 6 is a flow chart showing a computer method for transferring a fractional value of a diversity of proprietary rights asset types, according to an embodiment.

FIG. 6 is a flow chart showing a computer method 600 for transferring a fractional value of a diversity of proprietary rights asset types, according to an embodiment.

Figure 7:
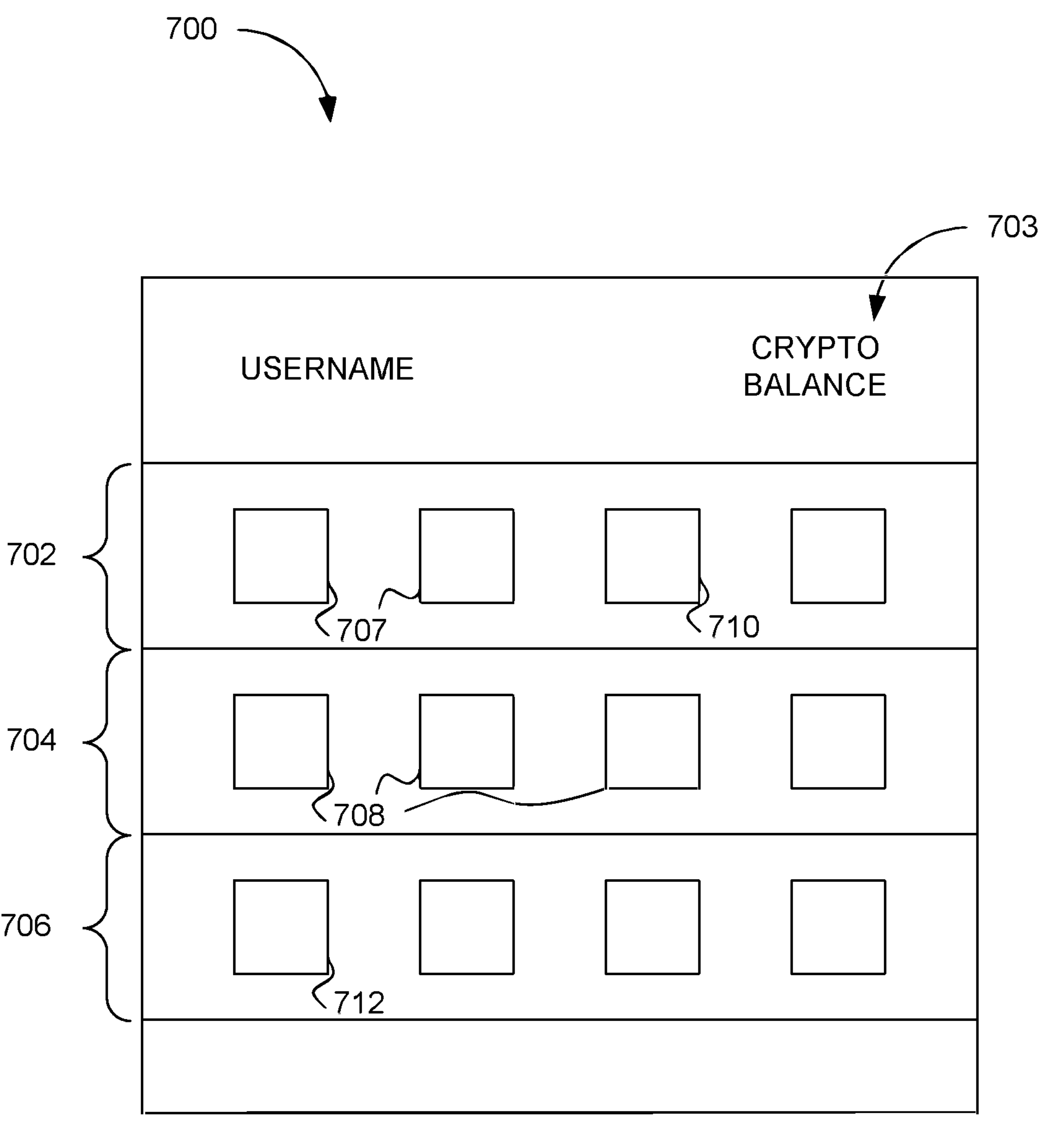
FIG. 7 is a diagram showing a graphical user interface (GUI) for presenting a diversity of proprietary rights asset types to a user, according to an embodiment.

FIG. 7 is a diagram showing a graphical user interface (GUI) 700 for presenting a diversity of proprietary rights asset types to a user, according to an embodiment.

With reference to FIG. 6 and FIG. 7, according to an embodiment, step 602 includes presenting a plurality of groups 702, 704 of proprietary rights assets as icons 706, 708 in a graphical user interface (GUI) 700.

Step 604 includes receiving a graphical selection of a particular proprietary rights asset 710 from a user via the GUI, according to an embodiment.

Step 606 includes swapping a cryptographic currency value from a user wallet for a corresponding proprietary rights asset token value from an exchange wallet, and step 608 includes making an indication 706 of a change in proprietary rights asset token balance in the user wallet via the GUI, according to an embodiment.

According to an embodiment, presenting the plurality of groups includes presenting a first region 702 including a first group proprietary rights assets 707 corresponding to a first attribute or type, and presenting a second region 704 including a group of proprietary rights assets 708 corresponding to a second attribute or type. In an embodiment, one or both of the first region 702 and the second region 704 may include slider controls to view other assets 707, 708 not presented at the instant shown in the GUI 700. In an embodiment the first region 702 may show icons 707, 710 corresponding to issued patents, and the second region 704 may show icons 708 corresponding to respective portfolios 708 of issued patents. In another embodiment, the first region 702 may include icons 707, 710 corresponding to proprietary rights asset tokens offered for sale to the user, and the second region 704 may include icons 708 corresponding to proprietary asset tokens held by the user. In an embodiment, a third region 706 may include icons 712 corresponding to exchange tokens or a cryptographic currency. In an embodiment, the GUI 700 may be responsive to a user dragging an icon 710 from the first region 702 to the second region 704 by transmitting a command to a server computer to initiate a transaction to swap a cryptographic currency or exchange token for the offered proprietary rights asset 710.

Similarly, the GUI 700 may be responsive to a user dragging an icon 708 from the second region 704 to the first region 702 by transmitting a command to a server computer to initiate a transaction to swap the dragged proprietary rights asset token 708 for a cryptographic currency or exchange token. In an embodiment the user may select a proprietary rights asset token 707, 710, 708, or cryptographic currency or exchange token 712 for respectively swapping as payment for the icon dragged in the first instance 710, 708 by performing a second instance of dragging an icon to a complementary region 702, 704, 706. In this way, the user may "buy" a selected proprietary rights asset token represented by an icon 710 by swapping for either a cryptographic currency or an exchange token 712 or for a presently held proprietary rights asset token 708.

Step 610 includes indicating a change in a cryptographic currency balance in the GUI, according to an embodiment.

Figure 8:
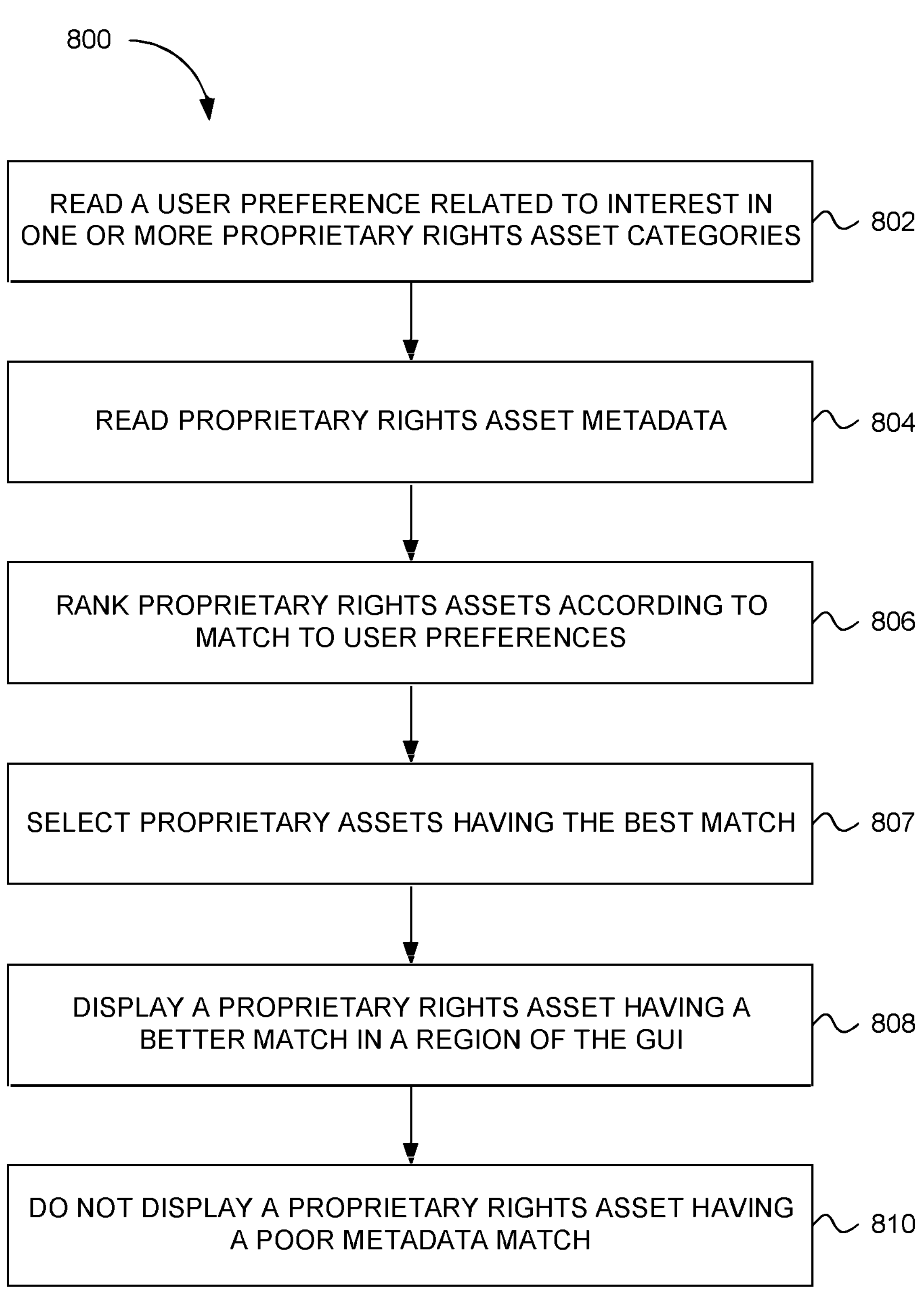
FIG. 8 is a flow chart showing a computer method for obtaining a user preference for graphical display of proprietary rights assets, such as for selecting proprietary rights assets to display in the graphical user interface of FIG. 7, according to an embodiment.

FIG. 8 is a flow chart showing a computer method 800 for obtaining a user preference for graphical display of proprietary rights assets, such as for selecting proprietary rights assets to display in the graphical user interface 700 of FIG. 7, according to an embodiment.

According to an embodiment, step 802 includes reading a user preference.

According to an embodiment, step 804 includes reading metadata corresponding to each of a plurality of proprietary rights assets.

Step 806 includes ranking an proprietary rights asset having a better metadata match to the user preference higher than an proprietary rights asset having a poorer metadata match to the user preference, according to an embodiment, and according to an embodiment, step 808 includes displaying the proprietary rights asset having the better metadata match in the first region.

According to an embodiment, step 810 includes not displaying the proprietary rights asset having the poorer metadata match to the user preference.

According to an embodiment, the method may include step 807. Step 807 includes selecting proprietary rights assets having the best match.

Figure 9:
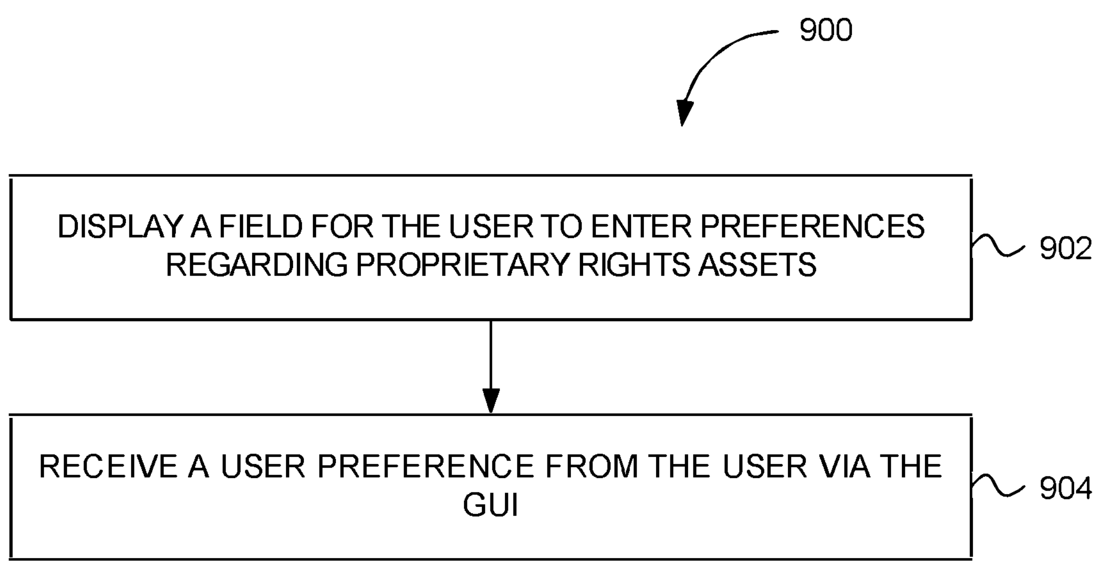
FIG. 9 is a flow chart showing a computer method for obtaining a user preference for graphical display of proprietary rights assets, such as for selecting proprietary rights assets to display in the graphical user interface of FIG. 7, according to an embodiment.

FIG. 9 is a flow chart showing a computer method 900 for obtaining a user preference with respect to proprietary rights asset categories or attributes, such as for selecting proprietary rights assets to display in the graphical user interface 700 of FIG. 7, according to an embodiment.

According to an embodiment, step 902 includes displaying a field for the user to enter preferences in the GUI, and according to an embodiment, step 904 includes receiving the user preference from the user via the GUI.

Figure 10:
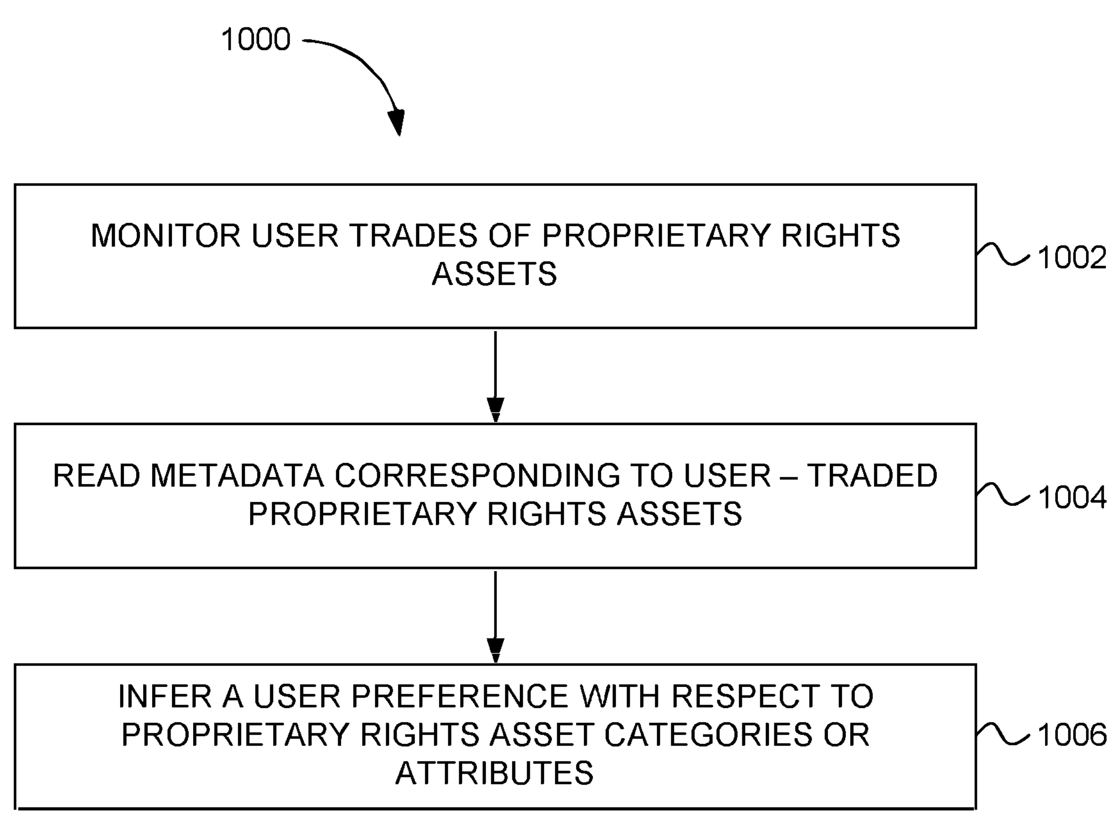
FIG. 10 is a flow chart showing a computer method for obtaining a user preference for graphical display of proprietary rights assets, such as for selecting proprietary rights assets to display in the graphical user interface of FIG. 7, according to another embodiment.

FIG. 10 is a flow chart showing a computer method 1000 for obtaining a user preference with respect to proprietary rights categories or attributes using artificial intelligence to infer user preference from user behavior, such as for selecting proprietary rights assets to display in the graphical user interface 700 of FIG. 7, according to another embodiment.

Step 1002 includes monitoring user trades of proprietary rights assets, according to an embodiment.

According to an embodiment, step 1004 includes reading a metadata corresponding to user-traded proprietary rights assets, and according to an embodiment, step 1006 includes inferring one or more user preferences based on the monitored trades.

With reference to FIG. 7, according to an embodiment, presenting the plurality of groups includes displaying a first region 702 having a first group of proprietary rights assets 707 displayed therein, and displaying a second region 704 adjacent, superjacent, or subjacent to the first region 702, the second region 704 having a second group of proprietary rights assets 708 displayed therein.

According to an embodiment, presenting the plurality of groups includes displaying a first group of proprietary rights assets in a first scroll bar of a GUI, and displaying a second group of proprietary rights assets in a second scroll bar of a GUI, separate from the first region.

According to an embodiment, presenting the plurality of groups includes displaying a first group of offered proprietary rights assets, and according to an embodiment, step 612 includes displaying at least one fractionally owned proprietary rights asset 712 in a region 706, separate from the first group 702.

According to an embodiment, displaying the region separate from the first group occurs only when the user owns a fraction of at least one proprietary rights asset.

According to an embodiment, a field 703 of the GUI may display one or both of a username and the user's balance of cryptographic currency.

Figure 11:
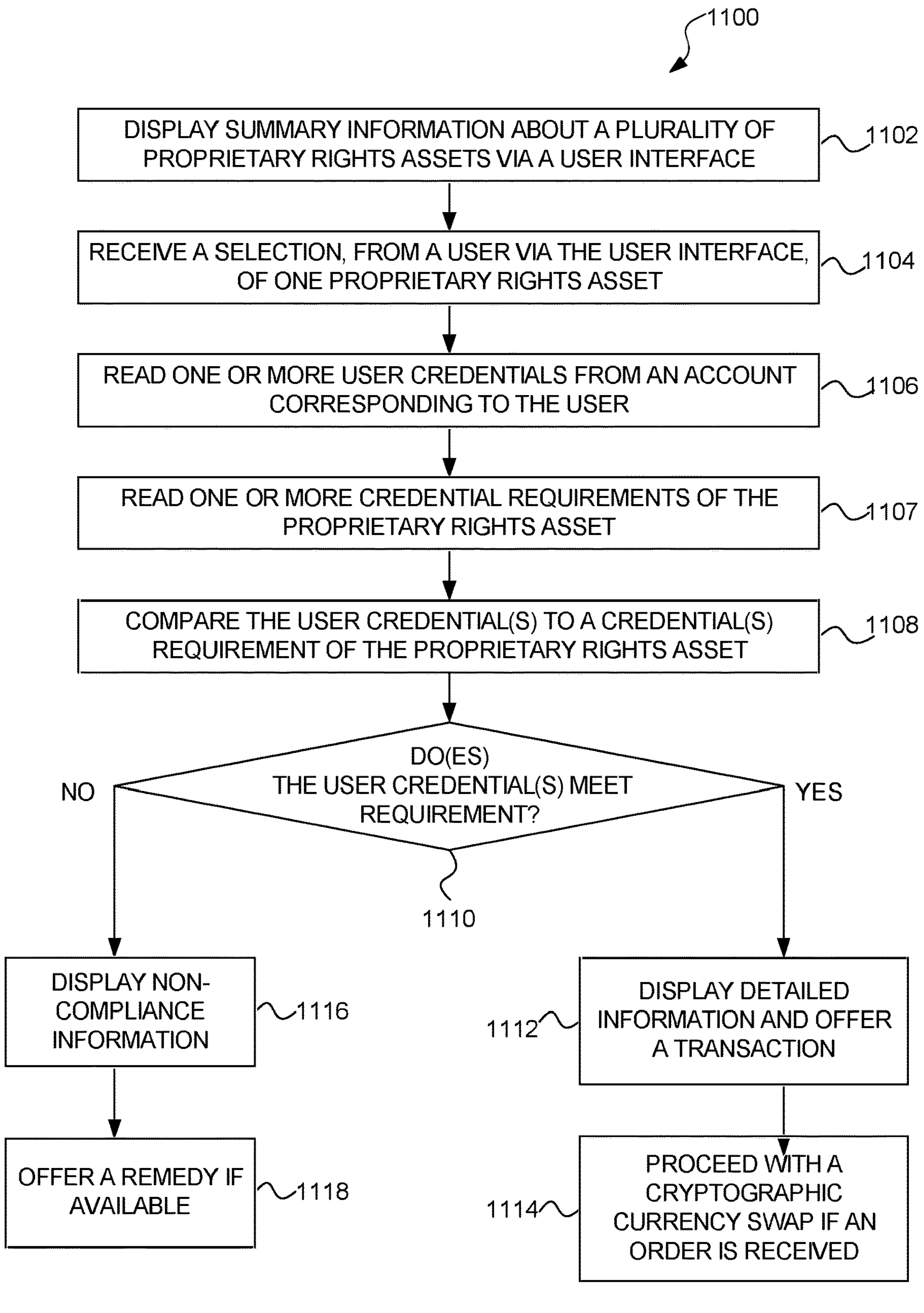
FIG. 11 is a flow chart showing a computer method for controlling access to a proprietary rights asset or information about a proprietary rights asset, according to an embodiment.

FIG. 11 is a flow chart showing a computer method 1100 for controlling access to a proprietary rights asset or information about a proprietary rights asset, according to an embodiment.

According to an embodiment, step 1104 includes receiving a selection of a proprietary rights asset via a user interface. Step 1106 includes reading one or more user credentials from account information corresponding to the user, according to an embodiment. According to embodiments, the identity of the user and/or the seller of a proprietary rights asset may be held anonymous. According to an embodiment, step 1106 may include loading a cryptographic token with user identity parameters that do not include an identity of the user. Such parameters may be generic such that neither the user nor an organization for which the user holds agency may be identified, but wherein the parameters provide proof of credentials.

Step 1107 may include reading one or more credential requirements from a data source corresponding to the proprietary rights asset. Reading one or more credential requirements from a data source corresponding to the proprietary rights asset in step 1107 may include decrypting and reading the one or more credential requirements from a distributed ledger or blockchain data structure such as from a cryptographic token. For example, the credential requirements may be predetermined by a lister of the proprietary rights asset.

Alternatively, the credential requirements may include express approval of the user by the lister of the proprietary rights asset. Step 1108 includes comparing the user credential to the one or more requirements, according to an embodiment. Step 1112 may include displaying, via the user interface, detailed information about the proprietary rights asset only if the user credential meets the one or more credential requirements, according to an embodiment.

According to an embodiment, the computer method 1100 may include step 1110. Step 1110 may include determining whether user credentials meet the credentials requirement. If the user credentials meet the credentials requirement, then the computer method proceeds to step 1112. If the user credentials do not meet the credentials requirement, then the computer method proceeds to step 1116.

According to an embodiment, step 1116 includes displaying non-compliance information indicating that the user credentials do not meet the user credentials requirement. According to an embodiment, the computer method 1100 includes step 1118. At step 1118 a remedy is offered to the user, if available.

The computer method 1100 may include step 1102, wherein at least summary information about a plurality of proprietary rights assets is displayed to the user via the user interface.

According to an embodiment, step 1112 may include offering a fractional interest in the proprietary rights asset if the user credential meets the credential requirement, via the user interface. The fractional interest may include a fractional ownership interest or a fractional economic interest.

According to an embodiment, step 1112 may include receiving an order to acquire the fractional interest in the proprietary rights asset. In one embodiment, step 1114 includes proceeding with a swap of a blockchain token corresponding to the proprietary rights asset for a cryptographic currency.

According to an embodiment, receiving a selection of the proprietary rights asset may include receiving a graphical command via the user interface.

According to an embodiment, the proprietary rights asset may include a patent. According to an embodiment, the proprietary rights asset may include a patent application. According to an embodiment, the proprietary rights asset may include a plurality of proprietary rights assets.

According to an embodiment, the credential requirement may include a user identity not being a member of a blacklist. According to an embodiment, the credential requirement may include the user being a member of a blockchain proprietary rights exchange. According to an embodiment, the credential requirement may include the user being a registered patent practitioner. According to an embodiment, the credential requirement may include the user not being anonymous.

According to an embodiment, the proprietary rights asset may include a patent application, and the credential requirement may include an agreement to maintain secrecy. According to an embodiment, the user credential may include registration as a bona fide patent investment firm. Additionally and/or alternatively, the user credential may include registration as a registered patent practitioner.

According to an embodiment, the proprietary rights asset may include an invention for which a patent is not yet filed, and the credential requirement may include an obligation to maintain secrecy. According to an embodiment, the user credential may include verification as being a registered patent practitioner without any subject matter or party conflict.

According to an embodiment, the computer method 1100 may include providing a communication opportunity between a user having an appropriate credential and a lister of the proprietary rights asset.

Figure 12:
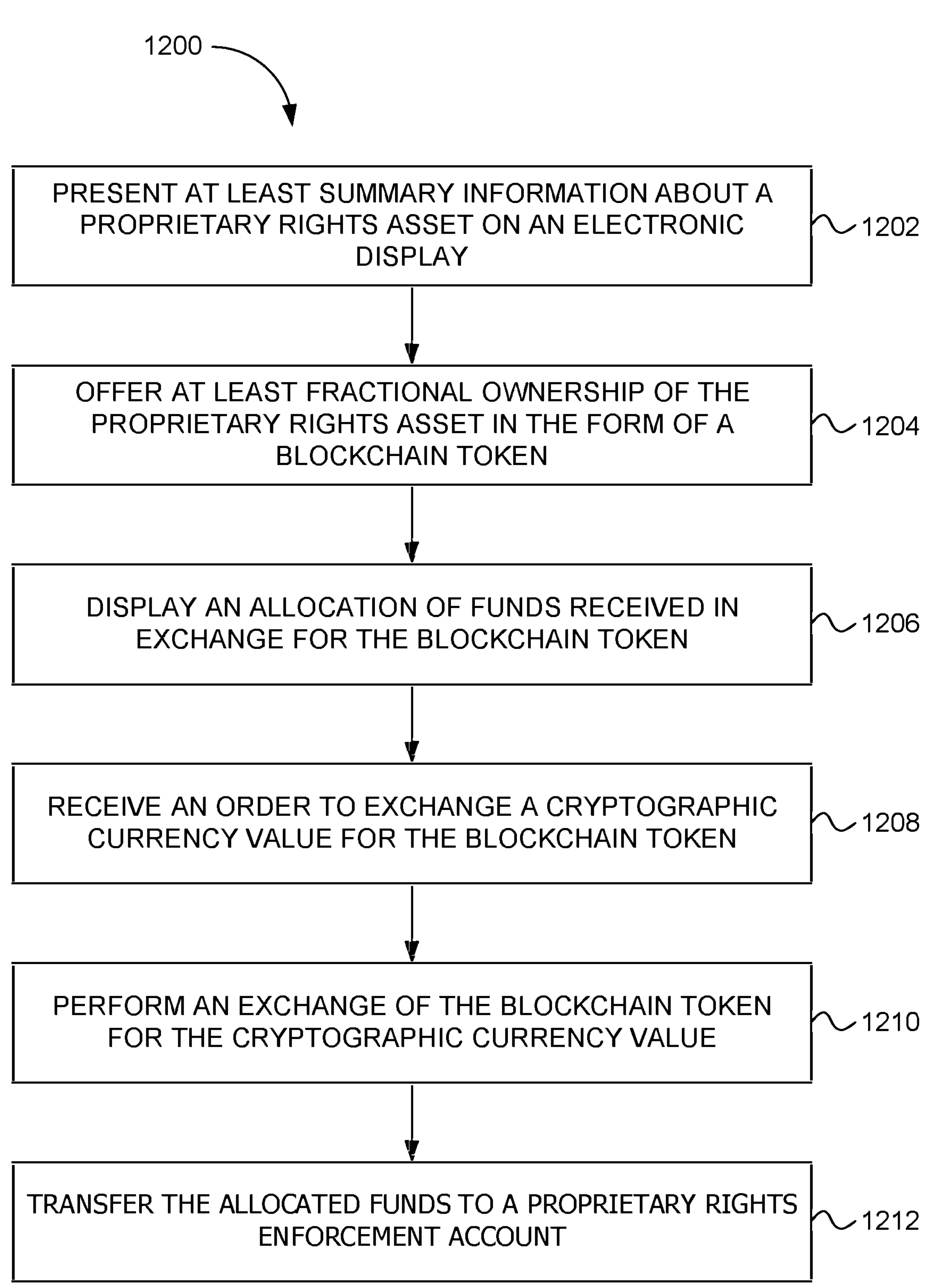
FIG. 12 is a flow chart showing a computer method for distributing a cost of enforcing a proprietary rights asset, according to an embodiment.

FIG. 12 is a flow chart showing a computer method 1200 for distributing a cost of enforcing a proprietary rights asset, according to an embodiment.

According to an embodiment, a computer method 1200 for distributing a cost of enforcing a proprietary rights asset (such as an intellectual property (IP) asset) includes, in step 1202, presenting at least summary information about a proprietary rights asset on an electronic display. According to an embodiment, step 1204 includes offering at least fractional ownership of the proprietary rights asset in the form of a proprietary rights asset blockchain token. According to an embodiment, step 1206 includes displaying an allocation of funds received in exchange for the proprietary rights asset blockchain token, including an allocation for possible future enforcement of IP rights corresponding to the proprietary rights asset. According to an embodiment, step 1208 includes receiving an order to exchange a cryptographic currency value or a second proprietary rights asset token value for the proprietary rights asset blockchain token. According to an embodiment, step 1210 includes performing an exchange of the proprietary rights asset blockchain token for the cryptographic currency value. Proceeding to step 1212, the allocated funds may be transferred to an enforcement account.

According to an embodiment, the proprietary rights asset corresponds to a patent enforceable in at least one country, and transferring the allocated funds to the enforcement account in step 1212 includes swapping the allocated cryptographic currency value for a corresponding value of fiat currency of the at least one country.

Figure 13:
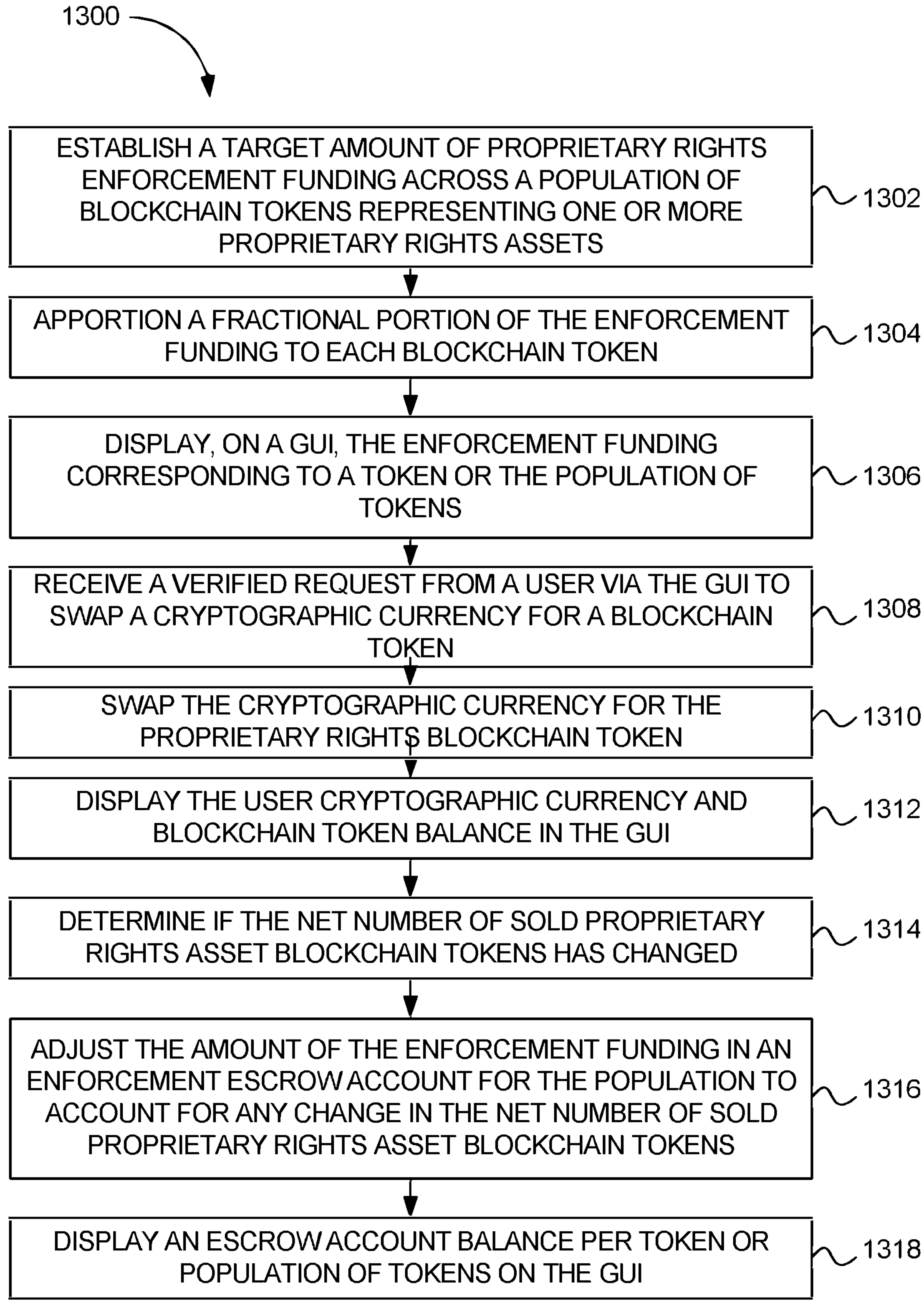
FIG. 13 is a flow chart showing a computer method for maintaining an allocation of funds for enforcing a proprietary rights asset, according to an embodiment.

FIG. 13 is a flow chart showing a computer method 1300 for maintaining an allocation of funds for enforcing a proprietary rights asset, according to an embodiment.

According to an embodiment, a computer method 1300 for maintaining an allocation of funds for enforcing an proprietary rights asset includes, in step 1302, establishing a target amount of proprietary rights enforcement funding across a population of blockchain tokens representing one or more proprietary rights assets. According to an embodiment, step 1304 includes apportioning a fractional portion of the enforcement funding to each blockchain token. According to an embodiment, step 1306 includes displaying, on a GUI, the enforcement funding corresponding to a proprietary rights asset token or the population of proprietary rights asset tokens. According to an embodiment, step 1308 includes receiving a verified request from a user, via the GUI, to swap a cryptographic currency, a second proprietary rights asset blockchain token corresponding to a second proprietary rights asset token, or an exchange token for a proprietary rights asset blockchain token. According to an embodiment, step 1310 includes making the swap. According to an embodiment, step 1312 includes displaying a cryptographic currency and proprietary rights asset blockchain token balance attributable to the user in the GUI. According to an embodiment, step 1314 includes determining if the net number of sold proprietary rights asset blockchain tokens has changed. According to an embodiment, step 1316 includes adjusting the amount of enforcement funding in an enforcement escrow account for the population to account for any change in the net number of sold proprietary rights asset blockchain tokens. According to an embodiment, step 1318 includes displaying an escrow account balance per proprietary rights asset token or population of proprietary rights asset tokens on the GUI.

According to an embodiment, the enforcement funding is held in a fiat currency. According to an embodiment, adjusting the amount of enforcement funding in step 1316 includes converting a number of cryptographic currency or the blockchain tokens into the fiat currency and depositing the fiat currency into an account. Additionally or alternatively, adjusting the amount of enforcement funding in step 1316 may include withdrawing an amount of fiat currency from the escrow account and converting the withdrawn fiat currency into cryptographic currency or the proprietary rights asset blockchain tokens.

Figure 14:
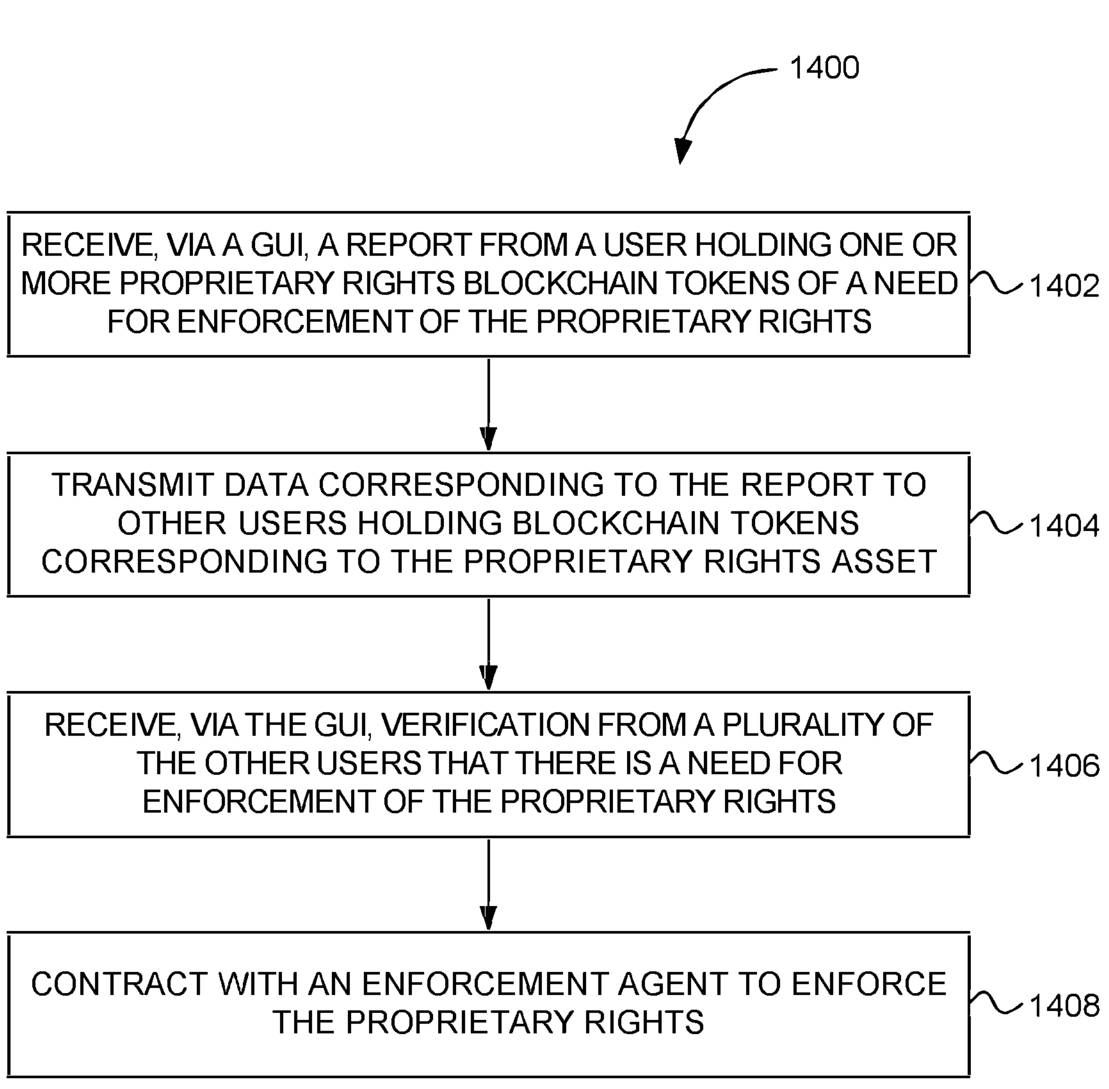
FIG. 14 is a flow chart showing a computer method for arranging enforcement of a proprietary rights asset, according to an embodiment.

FIG. 14 is a flow chart showing a computer method 1400 for arranging enforcement of a proprietary rights asset, according to an embodiment.

According to an embodiment, a computer method 1400 includes, in step 1402, receiving, via the GUI, a report from a user holding one or more proprietary rights asset blockchain tokens of a need for enforcement of the proprietary rights. According to an embodiment, step 1404 includes transmitting data corresponding to the report to other users holding proprietary rights asset blockchain tokens corresponding to the proprietary rights asset. According to an embodiment, step 1406 includes receiving, via the GUI, verification or agreement from a plurality of the other users that there is a need for enforcement of the proprietary rights.

According to an embodiment, step 1408 includes contracting with an enforcement agent to enforce the proprietary rights.

Figure 15:
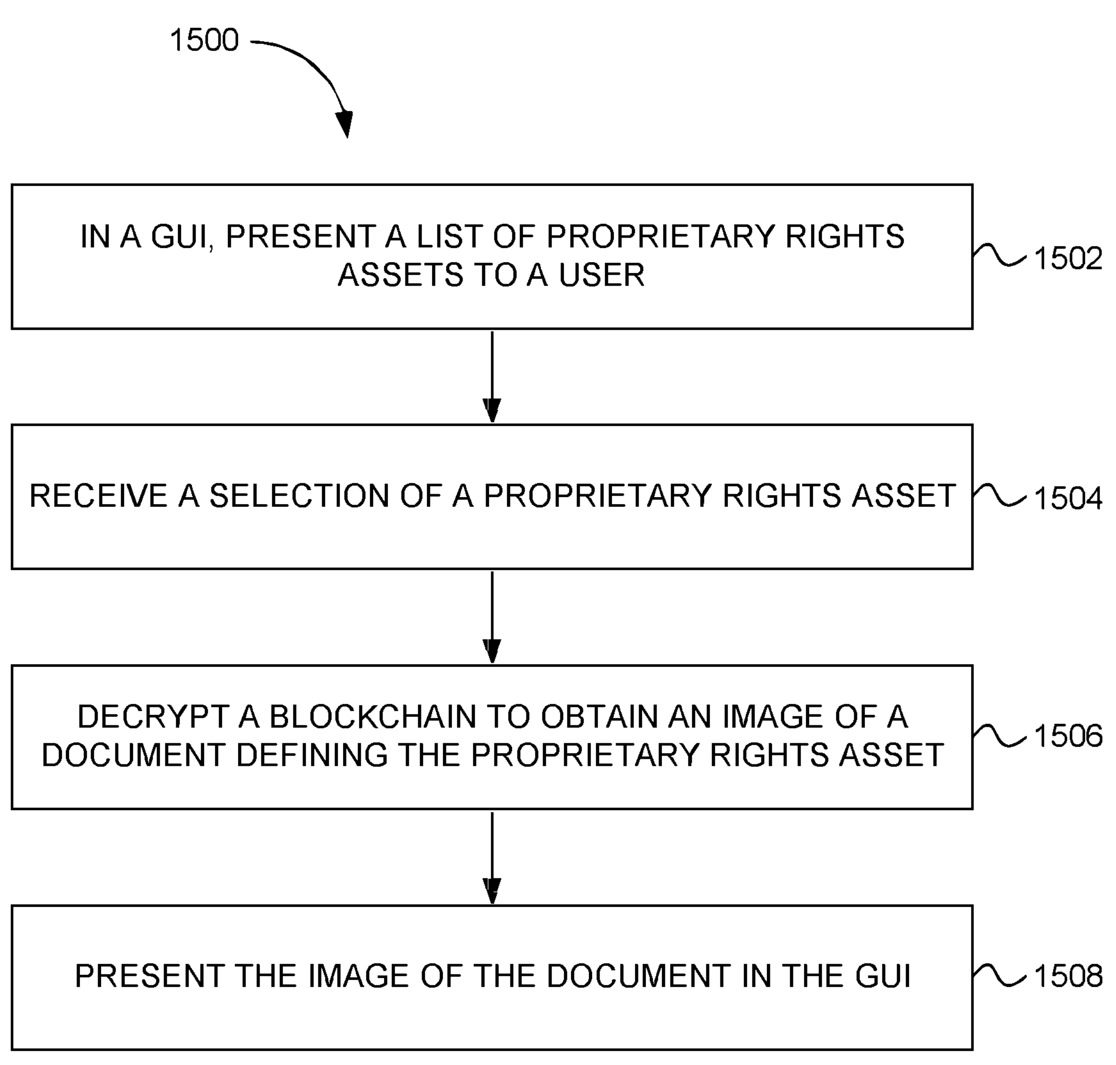
FIG. 15 is a flow chart illustrating a computer method for presenting information about a proprietary rights asset by presenting official documentation corresponding to the proprietary rights asset, according to an embodiment.

FIG. 15 is a flow chart illustrating a computer method 1500 for presenting information about a proprietary rights asset by presenting official documentation corresponding to the proprietary rights asset, according to an embodiment.

According to an embodiment, the computer method 1500 for presenting information about a proprietary rights asset (and optionally, transferring rights thereto) may include, in step 1502, presenting a list of at least one proprietary rights asset to a user via a graphical user interface (GUI) on an electronic display, and in step 1504, receiving a selection of the at least one proprietary rights asset from the user via the GUI. In step 1506, a blockchain data structure is decrypted to obtain an image of a document defining the proprietary rights asset. Proceeding to step 1508, the image of the document is presented to the user via the GUI.

Figure 16:
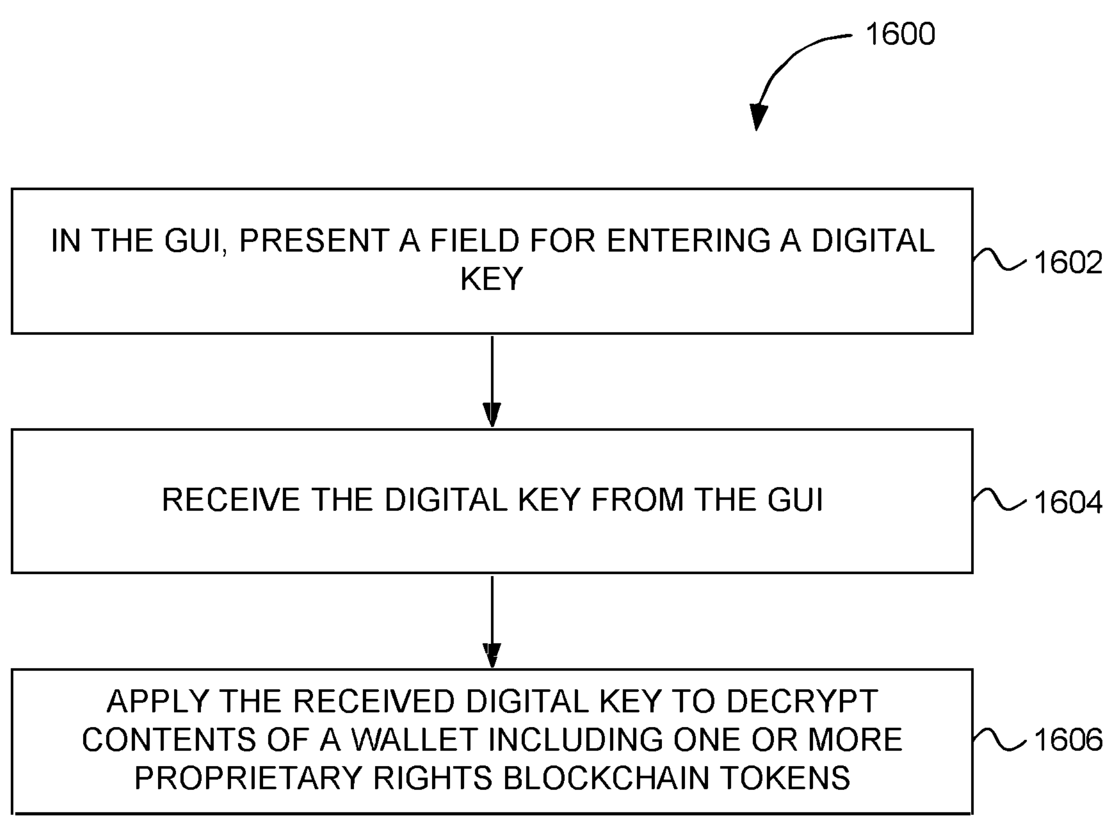
FIG. 16 is a flow chart illustrating a portion of a computer method for presenting information about a proprietary rights asset responsive to receipt of a digital key, according to an embodiment.

FIG. 16 is a flow chart illustrating a portion of a computer method 1600 for presenting information about a proprietary rights asset responsive to receipt of a digital key, according to an embodiment.

According to an embodiment, step 1602 includes presenting a field in the GUI for entry of a digital key. Step 1604 includes receiving the digital key from the user via the GUI. According to an embodiment, with reference to step 1606, the blockchain data structure is decrypted using the digital key. According to an embodiment, with reference to step 1604, receiving the digital key may include receiving a public key, or may include receiving a private key.

Figure 17:
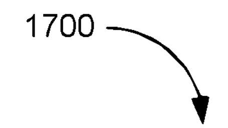
FIG. 17 is a flow chart illustrating a portion of a computer method for verifying proprietary rights asset documentation, according to an embodiment.

FIG. 17 is a flow chart illustrating a portion of a computer method 1700 for verifying proprietary rights asset documentation, according to an embodiment.

According to an embodiment, step 1702 includes transmitting, via the GUI, a request from the user for a transaction including viewing the image of the document. The request may be transmitted to a plurality of nodes on which the blockchain data structure resides. Step 1704 includes receiving verification from at least a portion of the nodes that the transaction is valid.

Figure 18:
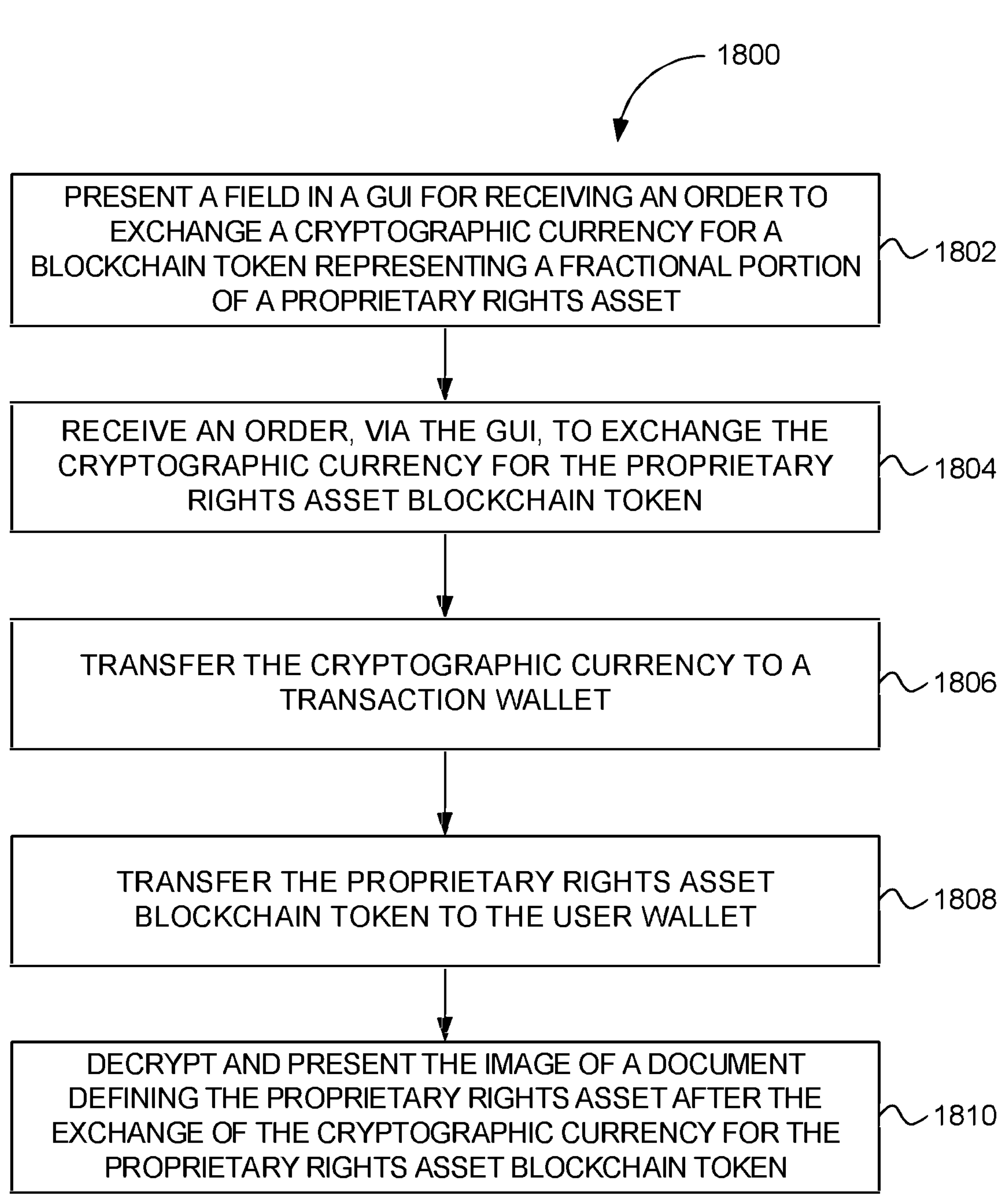
FIG. 18 is a flow chart illustrating a computer method for transferring a proprietary rights asset blockchain token representing an interest in the proprietary rights asset, according to an embodiment.

FIG. 18 is a flow chart illustrating a computer method 1800 for transferring a proprietary rights asset blockchain token representing an interest in the proprietary rights asset, according to an embodiment.

According to an embodiment, step 1802 includes presenting at least one field to the user, via the GUI, for receiving an order to exchange a cryptographic currency for a token defined by the blockchain data structure. Step 1804 includes receiving the order to exchange the cryptographic currency for the token. Step 1806 may include transferring the cryptographic currency to a transaction wallet. Step 1808 may include transferring the token to a user wallet.

According to an embodiment, the transaction wallet may have a static address. Alternatively, the transaction wallet may be allocated transiently.

According to an embodiment, in step 1810, presenting the image of the document to the user may require the exchange of the cryptographic currency for the token. According to an embodiment, in step 1810, presenting the image of the document to the user may require the user to be in possession of a private key that may be received with receipt of the token in the user wallet.

Figure 19:
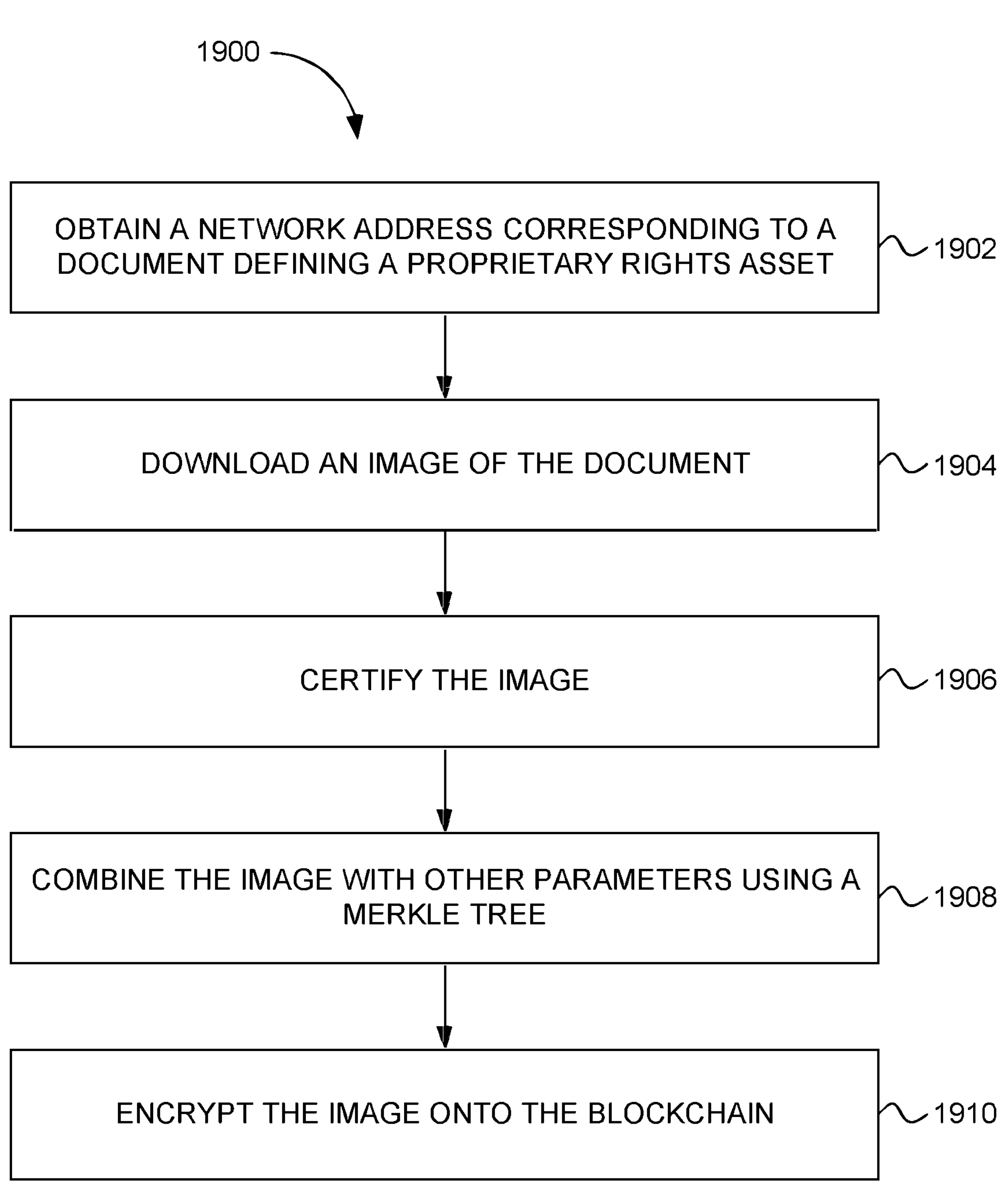
FIG. 19 is a flow chart illustrating a portion of a computer method for obtaining and securely storing certified documentation representing a proprietary rights asset, according to an embodiment.

FIG. 19 is a flow chart illustrating a portion of a computer method 1900 for obtaining and securely storing certified documentation representing a proprietary rights asset, according to an embodiment.

According to an embodiment, step 1902 includes obtaining a network address corresponding to the document defining the proprietary rights asset, and step 1904 includes downloading the image of the document from the network address. Step 1906 may include combining the image of the document with other parameters corresponding to the proprietary rights asset. In step 1908, the image and the other parameters may be encrypted onto the blockchain data structure. According to an embodiment, step 1910 includes encrypting the image onto the blockchain data structure. According to an embodiment, the image may be certified to be genuine according to a public key configured to decrypt at least a portion of the blockchain data structure. According to an embodiment, the lister of the proprietary rights asset may provide the network address corresponding to the image. According to an embodiment, the other parameters may include one or more of a patent title, a patent number, a patent application title, an application serial number, an application publication number, a priority date, a filing date, an inventor name, an abstract of an invention, a Public Patent Application Information Retrieval (PAIR) listing, a Private Patent Application Information Retrieval (PAIR) listing, a lister name, an assignment reel and frame number, an assignment image, a related art identification, an art classification number, a litigation status, and/or a term of token exchange.

According to an embodiment, with reference to step 1506 in FIG. 15, decrypting the blockchain data structure may include decrypting at least a portion of a public blockchain, decrypting data stored on a permissioned blockchain, decrypting at least a portion of a side chain, and/or decrypting at least one block. According to an embodiment, the document defining the proprietary rights asset may include an issued patent, a reissued patent, a published patent application, an unpublished patent application, an invention disclosure, and/or a patent portfolio description.

Figure 20:
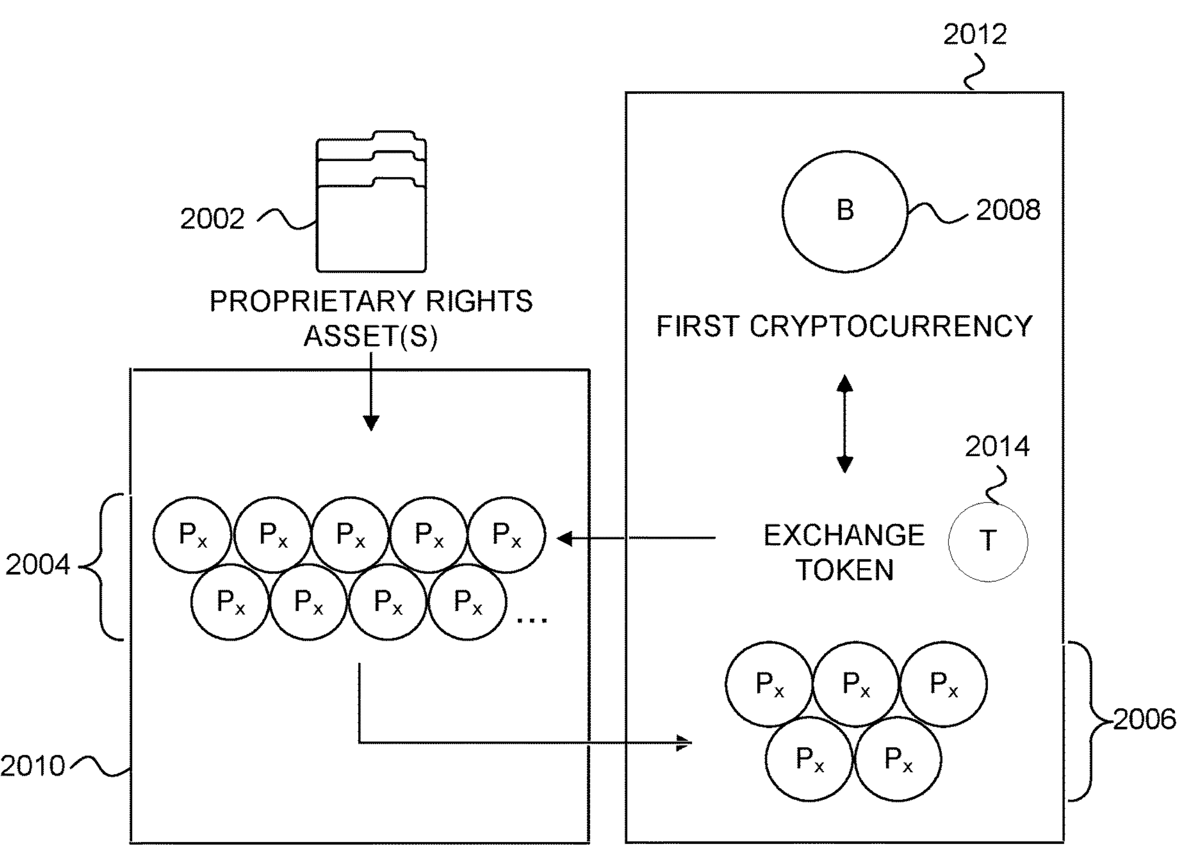
FIG. 20 is a diagram illustrating transactions related to a computer method for issuing a proprietary rights asset blockchain token representing at least one proprietary rights asset and transferring the proprietary rights asset token to a counterparty, according to an embodiment.

FIG. 20 is a diagram illustrating transactions related to a computer method for issuing a proprietary rights asset blockchain token representing at least one proprietary rights asset and transferring the proprietary rights asset token to a counterparty, according to an embodiment.

According embodiments, computer methods described herein include receiving into a server computer, via a first graphical user interface (GUI) displayed on an end device, a designation of one or more proprietary rights assets 2002. Each proprietary rights asset represents a particular right from a class of rights represented by one or more proprietary rights assets 2002.

According to embodiments, the computer methods include issuing a plurality of proprietary rights asset blockchain tokens 2004 representing the one or more proprietary rights assets 2002. Each of the plurality of proprietary rights asset blockchain tokens 2004 represents a fractional portion of at least an economic interest in the one or more proprietary rights assets 2002.

According to embodiments, the computer methods include displaying a graphical representation of at least a portion 2006 of the one or more proprietary rights asset blockchain tokens 2004 on at least one end user device as a second GUI.

According to an embodiment, the computer method 2000 includes receiving a buy order from a first know-your-customer (KYC)-compliant user via the second GUI displayed on a second end device, the buy order corresponding to a transfer of at least a fractional portion 2006 of the plurality of offered proprietary rights asset blockchain tokens 2004 for an agreed-upon value of a first cryptographic currency 2008.

According to embodiments, computer methods include transferring the fractional portion 2006 of the plurality of proprietary rights asset blockchain tokens 2004 from a transaction wallet 2010 to a buyer wallet 2012 held by the first KYC-compliant user.

As used herein, the term KYC-compliant user relates to system knowledge of the identity of the user. It will be understood that the KYC-compliant user's identity may be hidden from other users, including a lister of a proprietary rights asset. Various approaches may be used to ensure functional anonymity of an otherwise KYC-compliant user. As described above, in one approach, the system transmits a cryptographic token including a representation of user credentials, the cryptographic token serving as proof of credentials for a trustless transaction.

According to an embodiment, the agreed-upon value of the first cryptographic currency is transferred from the buyer wallet 2012 into the transaction wallet 2010.

According to an embodiment, the plurality of proprietary rights asset blockchain tokens 2004 fractionally represent an economic interest in possible future royalties, possible future sale of the plurality of proprietary rights assets, and/or possible future damages awarded to a plaintiff owning at least one of the at least one proprietary rights asset 2002.

According to an embodiment wherein the at least one proprietary rights assets 2002 include one or more of at least one issued patent, at least one pending patent application, at least one trade secret, at least one trademark, at least one aspect of knowhow, at least one design, at least one software (object, and/or source) code module, and at least one distribution right. In one embodiment, the at least one proprietary rights asset 2002 includes a class of rights of the same type (e.g., at least one issued patents, at least one pending patent applications, at least one trade secret, etc.). In another embodiment, the at least one proprietary rights asset 2002 includes a plurality of assets related by subject matter (e.g., assets related to aspects of self-driving cars, aspects of artificial intelligence, aspects of home automation, etc.). Additionally and/or alternatively, the at least one proprietary rights asset 2002 includes a plurality of assets curated by an expert or expert team. In another embodiment, the at least one proprietary rights asset 2002 includes a plurality of assets selected by a user. Additionally and/or alternatively, the at least one proprietary rights asset 2002 includes a plurality of assets selected by an artificial intelligence computer program by mapping a product category against available proprietary rights assets. For example, as described above in conjunction with the description related to FIG. 5, a user may input information about a product or service, and the system may provide a list of proprietary rights assets recommended for license. The list may be assembled, for example, using Bayesian logic or Boolean logic based on comparing terminology and relationships between terms in the product or service description to terminology and relationships between terms in descriptions of a population of available proprietary rights assets. The proprietary rights assets 2002 shown in FIG. 20 may be assembled according to the proprietary rights assets recommended for license.

According to one embodiment, transferring the agreed-upon value of the first cryptographic currency from the buyer wallet 2012 includes converting the first cryptographic currency into a second cryptographic currency 2014 such as an exchange token, and transferring the second cryptographic currency 2014 from the buyer wallet 2012. In another embodiment, transferring the agreed-upon value of the first cryptographic currency from the buyer wallet 2012 includes transferring the agreed-upon value as a transfer of the first cryptographic currency from the buyer wallet 2012.

Figure 21:
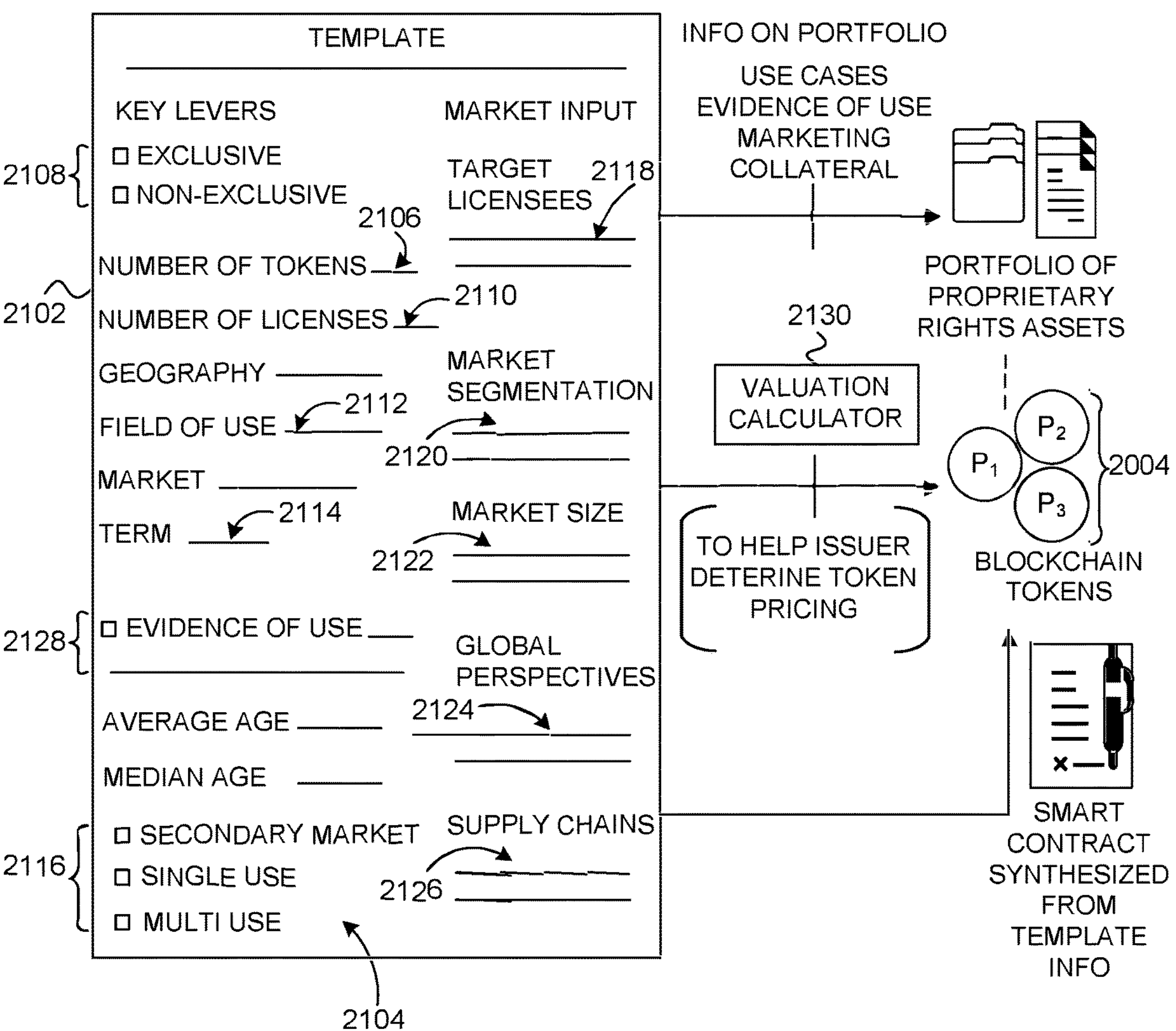
FIG. 21 is a diagram illustrating a graphical user interface for receiving a proprietary rights asset and issuing proprietary rights asset blockchain tokens representing an economic interest in the proprietary rights asset, according to an embodiment.

FIG. 21 is a diagram illustrating a graphical user interface for receiving at least one proprietary rights asset and for issuing a proprietary rights asset blockchain token representing the at least one proprietary rights asset, according to an embodiment.

According to embodiments, computer methods include receiving, into a server computer, a designation of at least one proprietary rights asset owned by a person or an enterprise. The computer methods may include presenting an proprietary rights asset attribute graphical user interface (GUI) 2102 to a user holding agency for the person or the enterprise. The proprietary rights asset attribute GUI 2102 includes a field 2104 for receiving information (e.g., one or more attributes) related to a proprietary rights asset.

According to embodiments, computer methods described herein include receiving a binding contract from the user to convert at least a portion of an economic interest in the proprietary rights asset to a quantity of proprietary rights asset tokens.

According to embodiments, computer methods described herein include determining the quantity of proprietary rights asset tokens to issue corresponding to the proprietary rights asset.

According to embodiments, computer methods described herein include issuing the quantity of proprietary rights asset tokens. The issued proprietary rights asset tokens may carry a contract (e.g., a smart contract) corresponding to a binding contract, such as an assignment of rights, via the plurality of proprietary rights asset tokens, to a subsequently identified party or parties. In another embodiment, the issued proprietary rights assets may include a license to use, a paid-up license to use, or a covenant not to sue over use of the proprietary rights represented by the proprietary rights asset and tokens associated therewith. The proprietary rights asset tokens may further carry the attributes of the at least one proprietary rights asset.

According to embodiments, computer methods described herein include receiving documented proof of ownership of the at least one proprietary rights asset. According to embodiments, computer methods described herein include writing data corresponding to the documented proof of ownership of the at least one proprietary rights asset to the proprietary rights asset tokens 2004.

According to an embodiment, the user holding agency for the person is the person having ownership of the proprietary rights asset.

According to an embodiment, the user holding agency for the enterprise includes a legal representative of the enterprise. In another embodiment, the user holding agency for the enterprise includes a person having a fiduciary or legal duty to the enterprise.

According to an embodiment, presenting an proprietary rights asset attribute GUI 2102 to the user includes presenting a field 2106 for receiving token issuance information. In an embodiment, receiving into the server computer one or more attributes of the at least one proprietary rights asset includes receiving the token issuance information. In an embodiment, the token issuance information includes a number of tokens to be issued. Additionally and/or alternatively, the token issuance information includes a definition of an economic interest to be represented by the tokens.

According to another embodiment, presenting a proprietary rights asset attribute GUI 2102 to the user includes presenting a field 2108, 2110, 2112, 2114, 2116 for receiving proprietary rights asset license terms. In an embodiment, receiving into the server computer one or more attributes of the at least one proprietary rights asset includes receiving the proprietary rights asset license terms.

According to another embodiment, presenting an proprietary rights asset attribute GUI 2102 to the user includes presenting a field 2118, 2120, 2122, 2124, 2126, 2128 for receiving proprietary rights asset market information. In an embodiment, receiving into the server computer one or more attributes of the at least one proprietary rights asset includes receiving the proprietary rights asset market information.

According to embodiments, computer methods described herein include operating, with the server computer, a valuation calculator software module 2130 to estimate a valuation for the at least one proprietary rights asset. According to embodiments, computer methods described herein include outputting a recommended token price to the user.

According to embodiments, computer methods described herein include receiving a token price approval or a token price from the user via the proprietary rights asset attribute GUI 2102.

According to an embodiment, determining the quantity of proprietary rights asset tokens to issue corresponding to the proprietary rights asset includes operating, with the server computer, the valuation calculator software module 2130 to estimate the quantity of proprietary rights asset tokens 2004 to issue for the at least one proprietary rights asset. In an embodiment, determining the quantity of proprietary rights asset tokens to issue corresponding to the proprietary rights asset includes outputting the estimated quantity of proprietary rights asset tokens to the user via the proprietary rights asset attribute GUI 2102. In an embodiment, determining the quantity of proprietary rights asset tokens to issue corresponding to the proprietary rights asset includes receiving approval of the quantity of proprietary rights asset tokens from the user via the proprietary rights asset attribute GUI 2102.

Figure 22:
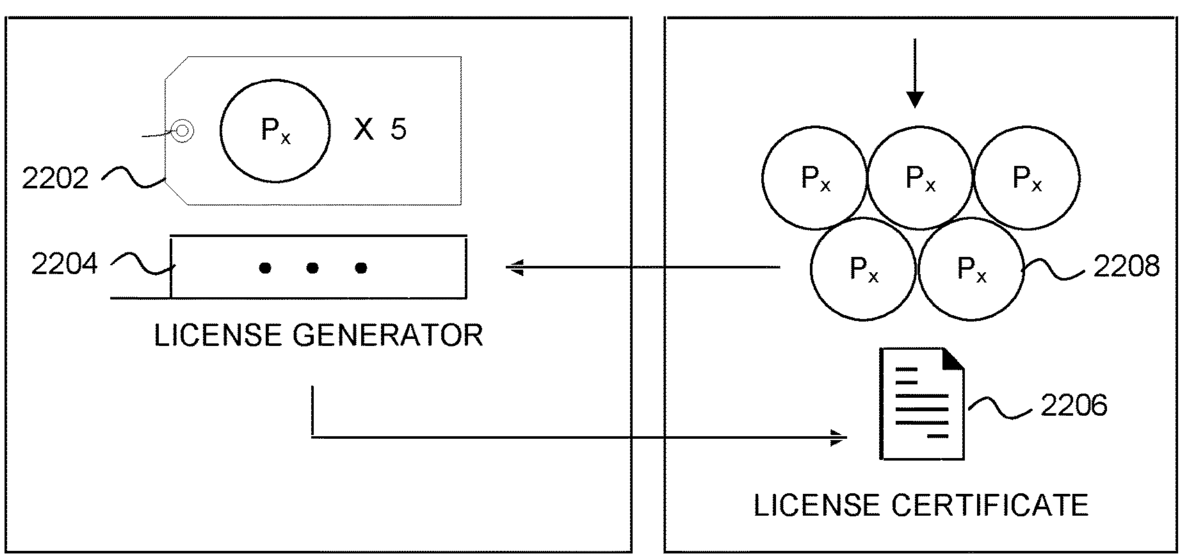
FIG. 22 is a diagram illustrating converting proprietary rights asset blockchain tokens into a license to a proprietary rights asset, according to an embodiment.

FIG. 22 is a diagram illustrating conversion of proprietary rights asset blockchain tokens into a license to a proprietary rights asset, according to an embodiment. A graphical user interface (GUI) displays a price 2202 in terms of proprietary rights asset tokens for securing a license in a proprietary rights asset. A user having a sufficient quantity 2208 of proprietary rights asset tokens. The user selects to obtain a license for the proprietary rights asset and provides the quantity 2208 of proprietary rights asset tokens corresponding to the price 2202.

A license generator 2204 generates a license indicating that the user has obtained a license for the proprietary rights asset. The license generator provides a license certificate 2206 to the user. For example, the license certificate may include a cryptographic license token (e.g., a non-fungible token or NFT), according to an embodiment One embodiment includes a blockchain-based trading exchange for proprietary rights assets. The exchange may allow proprietary rights assets such as patents, to be listed, priced, and traded 24/7. The exchange's blockchain infrastructure enables a transparent and liquid proprietary rights market by providing visibility of ownership, exclusivity, and acquisitions—all in real-time, according to one embodiment.

In one embodiment, the exchange may be available in all countries and operate 24 hours per day, 7 days per week, 365 days per year, allowing the use and ownership of proprietary rights, or economic interest in proprietary rights, to be traded in real time. For inventors, corporations, universities, and other institutions holding proprietary rights, users of proprietary rights, and speculators, the exchange may bring liquidity to the proprietary rights market.

In one embodiment, the exchange uses proprietary exchange tokens as its sole currency. The tokens may be based on Etherium ERC-20 or ERC-721 standards or other public blockchain token. Exchange tokens may be fungible or non-fungible. Because the number of tokens is limited, the value of each token (non-fungible token value being determined corresponding to an exchange rate or variable price) may increase with the growth of the exchange. Alternatively, the exchange may use one or more cryptographic currencies as a medium of exchange.

Today's proprietary rights market is opaque. It lacks transparency of pricing and information related to usage and availability. Proprietary rights are most often bought and sold through lengthy backroom negotiations—or expensive and protracted litigation.

Innovators and proprietary rights owners have few options for making their assets known to the world. Most buyers and sellers do not find each other for a variety of reasons. First, just seeking a proprietary rights owner signals interest, often resulting in an unreasonable asking price. Second, the very fact that a buyer has found an owner signals a potential infringement issue, which greatly benefits the owner in a negotiation.

FIGS. 20 and 22 represent some elements of the exchange and the steps that members may take to participate, according to one embodiment.

According to one embodiment, in FIG. 20, investors, traders, potential licensees, and other interested parties swap Bitcoin, Ether, or other supported cryptographic currency in trade for exchange tokens. The transaction is reversible, meaning exchange tokens may be swapped back into a supported cryptographic currency at any time. In another embodiment, members may swap exchange tokens for selected proprietary rights asset tokens, each representing a specific patent portfolio. Just like a stock in a traditional exchange, the price of each proprietary rights asset token may be driven by its demand and the underlying value of the proprietary rights asset(s) it represents.

According to one embodiment, in FIG. 22, proprietary rights asset tokens carry self-executing smart contracts, which may be customized to enable exchange members to buy and sell license rights. Depending on issuer selection at the point of proprietary rights asset token creation, a predetermined number of proprietary rights asset tokens may be swapped into a license generator for a license to use. The license generation is reversible and, if allowed by the issuer, the license may be transferable. In another embodiment, reports may be generated upon completion of transactions to respectively purchase proprietary rights asset tokens and generate licenses. The reporting function informs the market and helps create transparency in the process.

In one embodiment, all transactions on the exchange may be conducted exclusively in tokens, which may be freely tradable Ethereum ERC-20 tokens available on all major 3rd party public exchanges. The number of tokens may be fixed. As such, tokens function as a currency. The total value of the tokens may be seen as an index of the exchange—like a Dow Jones Industrial Average for patents. The tokens may process transactions in the crypto equivalent of pennies or billions of dollars with equal efficiency and at a very low transaction cost. Investors, traders, potential licensees and other interested parties swap major cryptocurrencies like Bitcoin and Ether into the tokens. Transactions may also be reversed back into cryptographic currency (and further converted into any fiat currency, if desired).

In one embodiment, the tokens may be used to purchase specific proprietary rights asset tokens listed on the exchange, each corresponding to a selected patent or portfolio of patents. The value of a proprietary rights asset token is driven by the relevance and demand of the underlying patents, domain activity, strength of the claims in the asset set, and speculation activities. For example, a portfolio that includes patents having claims in seminal technologies, or that are infringed by many marketed products, may tend to have a higher demand than a portfolio that has little relevance to current economic activity.

In one embodiment, proprietary rights asset tokens may be created by the owner of a proprietary rights asset (which may be referred to as the issuer). The number of proprietary rights asset tokens associated with a single portfolio may be fixed. However, even in that instance, the total number of proprietary rights asset tokens issued by issuers is only limited by the number of patents issued in the world. As the number of different proprietary rights asset tokens listed increases over time and brings with it increased volume and market participation, it is anticipated that the tokens may enjoy increased market liquidity and demand. This liquidity may drive more new listings and further support the value of the limited proprietary currency.

In one embodiment, operating revenue may be generated by charging a small fee for the exchange of the exchange tokens into proprietary rights asset tokens and for each trade on the exchange. Issuers may pay an initial listing fee, along with fees for back-end reporting, security and periodic updates. A fee-based service may be offered to members to help provide intellectual property and market insights to curate patent portfolios. Additional portfolio and proprietary rights asset token development services may logically flow from further development of a healthy market ecosystem developed through the connector described later in this document. In one embodiment, exchange participation may be encouraged to build out a full exchange ecosystem.

In one embodiment, an issuer wishing to list proprietary rights asset tokens on the exchange may be provided tools to easily navigate the listing process and package their patents in a manner that they believe is best. In addition to listing basic portfolio information through a user interface, issuers may be able to systematically define (within market-set parameters) information regarding the licensing parameters of the patents in a given portfolio, including, but not limited to: exclusivity, geography, field of use, market segment, term, etc.

In one embodiment, this same user interface tool may also allow issuers to collaborate or partner with other patent holders that may have complementary proprietary rights that may be constructed together into a single proprietary rights asset token of potentially greater value.

In one embodiment, once a proprietary rights asset token is constructed and ready for launch, the issuer purchases and stakes the tokens to an Ethereum Smart contract. This triggers the execution of code that controls the minting and distribution of proprietary rights asset tokens on a side-chain. The side-chain state root may be anchored to the Ethereum Network to ensure immutability.

In FIG. 21, according to an embodiment, the template may be the tool that allows issuers to rapidly and systematically create a unique proprietary rights asset token that is backed by a context-rich patent portfolio targeting specific audiences and unique objectives, including appropriate sizing to encourage liquidity. The template may help guide the issuer through a broad swath of use cases, which may be organized by logic primarily associated with the licensing terms and their origins.

A characteristic of the template, according to one embodiment, includes granularity of inputs. In one embodiment, the template may provide issuers with fine-grain control over subjective portfolio characteristics, including key levers like licensing exclusivity, field of use, and term. It may also provide market input details to provide clarity on target licenses and market parameters.

Another characteristic of the template, according to one embodiment, includes formulation of the smart contract. In one embodiment, the details pulled from the template may form the foundation of the smart contract associated with the specific patent portfolio, and in the minting of the proprietary rights asset token.

A third characteristic of the template, according to one embodiment, includes informing valuation of proprietary rights asset token. In one embodiment, in conjunction with the creation of the smart contract, information sourced from the template may determine an expected valuation range to inform suggested pricing in the minting of the proprietary rights asset token for that specific patent portfolio.

In one embodiment, the template is a user interface that may assist issuers in packaging patents into a portfolio, which is tokenized with a specific proprietary rights asset token. The Inventors envision building the template to enable the construction of portfolios and their corresponding proprietary rights asset tokens around key themes such as: Technology, Sector, Foreign Counterpart, Pivot, Seminal, Academic, Products, Global Distribution, Brand License, and Global Startup Consortium.

According to an embodiment, the key theme of Technology may include portfolios that target certain technology areas (e.g., Artificial Intelligence (AI), Autonomous Electric Vehicles (AEVs), Augmented Reality (AR), Blockchain), according to one embodiment. These may contain patents from a single source or from multiple sources.

The key theme of Sector may include portfolios that target certain market verticals (e.g., automotive, cloud computing, mobile communications), according to one embodiment. Sector portfolios may contain patents from a single source or from multiple sources.

The key theme of Foreign Counterpart may include a collection of specific foreign counterparts for an existing portfolio, according to one embodiment.

The key theme of Pivot may be listed by a single corporate entity who has made a strategic decision that they no longer need, and wish to monetize, certain patents, according to one embodiment.

The key theme of Seminal may include single patents or patent families that have standalone value such as molecules, pharmaceuticals, and inventions that lead to step functions, according to one embodiment.

The key theme of Academic may be listed by a single university or research institution wanting to broaden the reach of their licensing, according to one embodiment.

The underlying proprietary rights assets in the key theme of Products category may include actual products, according to one embodiment. The exchange is a means for members to gain access to partners that cannot only license IP but may also become distribution, marketing and/or manufacturing partners for existing products.

In the key theme of Global Distribution, small and medium companies in one part of the world have often already launched products that a large company in another geography is keen to distribute, according to one embodiment. Licensing these products for distribution in their home market allows the large company to leverage their existing sales and distribution infrastructure.

The key theme of Brand License may include a rapid and cost-effective way to license a brand for distribution and sales in a region currently not served, according to one embodiment.

In the key theme of Global Startup Consortium, connecting start-ups around the globe that are working towards the same end goal; however, with slightly unique IP, according to one embodiment. The exchange gives these companies a computer method to hedge their technology risk by gaining IP access to competing technologies in geographies that the originator cannot pursue.

Patent infringement is a practical reality in the Intellectual Property market. In one embodiment, the exchange may serve to make licensing easier, more transparent, and less costly, therefore naturally driving down patent infringement cases. However, there may inevitably be companies that choose to actively infringe patents that are traded as proprietary rights asset tokens on the exchange. Using the court system may be an inefficient way to handle these matters; however, in these cases it may be a necessary last resort to ensure owners are compensated fairly for their IP.

In one embodiment, the issuers of the proprietary rights asset tokens may be given a number of mechanisms, via the underlying ERC-20 smart contract, to deal with protecting the patents in their portfolio. This is made clear as part of the proprietary rights asset token issuance. These mechanisms may include, but are not limited to: issuer reserving the right to defend the proprietary rights at their discretion; issuer extending the right to defend the proprietary rights, under specific terms, to the owners of their proprietary rights asset tokens; issuer having the ability to issue a new proprietary rights asset token to fund legal defense (such as where the new proprietary rights asset token describes the economic arrangement between the original proprietary rights asset token and the new proprietary rights asset token); issuer paying a finder's fee in proprietary rights asset tokens, to other exchange members that identify cases of infringement (or alternatively, proprietary rights asset tokens may be issued with a bounty provision whereby successful defenders of infringement may be compensated with a portion of damages paid); and/or issuer purchasing infringement insurance to the extent available to protect the value of a proprietary rights asset token.

In one embodiment, the tokens may be a cryptographic currency specialized for use on the exchange. In one embodiment, tokens may be the only currency used to trade on the exchange, and the maximum number of the tokens may be permanently fixed. Increased demand for the tokens comes when other currencies may be transferred and held in the tokens. The more liquidity and market participation the exchange may provide, the more value the tokens may represent.

Similarly, the value of individual proprietary rights asset tokens may be subject to the same market dynamics as may the value of the patents they represent, according to one embodiment. Market participation may be encouraged in many ways in order to build out a full market ecosystem. This includes the ability to license through the purchase of a given proprietary rights assettoken.

In one embodiment, a proprietary rights asset token, representing a patent portfolio, with strong demand for licensing may tend to not only increase demand for those proprietary rights asset tokens but also increase demand for the tokens. Further, to the extent that issuers create proprietary rights asset tokens with license rights that cleave off from the proprietary rights asset token, then converting proprietary rights asset tokens to a license removes the tokens from the supply, thereby reducing the supply. In this way, widespread licensing of patents may tend to increase the value both of the exchange tokens and proprietary rights asset tokens for those still holding those respective coins.

In FIG. 22, according to an embodiment, at the time of creation of a proprietary rights asset token, the percentage of proprietary rights asset tokens required to generate a license is at the discretion of the issuer. For example, the issuer may select a predetermined fixed number of proprietary rights asset tokens necessary for a license, and that license (or licenses) may be a function of exclusivity, territory, term, number of licensed items produced, etc. Licenses considered to be more desirable may require the purchase of a greater number of proprietary rights asset tokens. Less desirable licenses may require the purchase of fewer proprietary rights asset tokens.

In one embodiment, if the issuer is uncertain about market reception and wants to test the waters, it may offer proprietary rights asset tokens in a limited amount initially, say 20% of the proprietary rights asset tokens created, and retain the remaining 80%. Remaining proprietary rights asset tokens may be released periodically, according to demand, if the issuer is pleased with the market reception. However, if the issuer sees need to change the terms, it may purchase and burn the issued proprietary rights asset tokens and create a new proprietary rights asset token with improved licensing terms. Of course, the issuer may be able to use other techniques to garner market interest, in addition to using the template, by (a) inquiring of market participants, (b) obtaining minimum price guarantees from a market maker in exchange for a fee, (c) pre-selling a portion or substantially all of the proprietary rights asset tokens similar to an initial public offering (IPO), or (d) selling proprietary rights asset tokens a little at a time to avoid overwhelming the market or to wait for an improving market.

FIG. 22 illustrates, according to one embodiment, a process to generate a license for a technology on the exchange, a licensee may accumulate enough proprietary rights asset tokens to obtain the type of license desired according to blockchain-accessed data carried by that proprietary rights asset token, according to one embodiment. For example, the licensee may purchase 5 proprietary rights asset tokens on the exchange from the lowest-priced seller and pay the 5 proprietary rights asset tokens into the license generator. At that point, a license certificate may be created and the 5 proprietary rights asset tokens burned, reducing the outstanding supply of proprietary rights asset tokens. This may be appropriate, for example, for a license that is exclusive in some aspect or when the issuer believes the market size for licenses may be limited. There may be various approaches to dealing with proprietary rights asset tokens used to purchase licenses. For example, in the case of a fully exclusive license, or sale of a partial license to a last remaining field or territory, generation of a license may require obtaining a supermajority to entirety of the outstanding proprietary rights asset tokens. This may be likened to a tender offer for the portfolio. In the case of a supermajority but the entirety of proprietary rights asset tokens, an equitable means of compensating the minority proprietary rights asset token holders may be required. Certain licenses, such as Standards-Essential licenses required to be licensed under Fair, Reasonable, And Non Discriminatory (FRAND) parameters may need to be delivered, and proprietary rights asset tokens recycled, according to a different mechanism. There may be additional means and computer methods to license involving non-exclusive licenses, restrictions on the types of licensees, payment of fees to other proprietary rights asset token holders, etc., including beta testing with charter members in order to generate broad market feedback.

In one embodiment, patent professionals from around the world may actively participate in the exchange either directly or indirectly. Subject matter experts may provide fee-based market research on valuable proprietary rights asset tokens sold below or above market value. Others may offer a proprietary rights fund for interested individuals or groups. Patent attorneys, agents and brokers may use their deep knowledge to identify mispriced proprietary rights asset tokens or those whose terms are violated. Inventors may identify opportunities to support the curation process to produce a more complete patent portfolio from stranded patents from a corporation, university, or research institute.

In one embodiment, the result is a complete proprietary rights ecosystem featuring transparent, low friction negotiation of proprietary rights carried on contracts carried by proprietary rights asset blockchain tokens. Existing proprietary rights licensing ecosystem stakeholders may be supported by the exchange model, as are patentees and licensees, as well as investors and traders in the system.

In one embodiment, through the collective actions of all market participants, the patent market may see both known and new third-party services becoming available—and dramatically change how innovation is managed. Ideas include: library consolidators for various industries or technological segments; new models for patent infringement protection and clearing houses; ratings and pricing advisories; granular coverage of trends and news; and packaging and analysis of the real-time exchange information.

Figure 23:
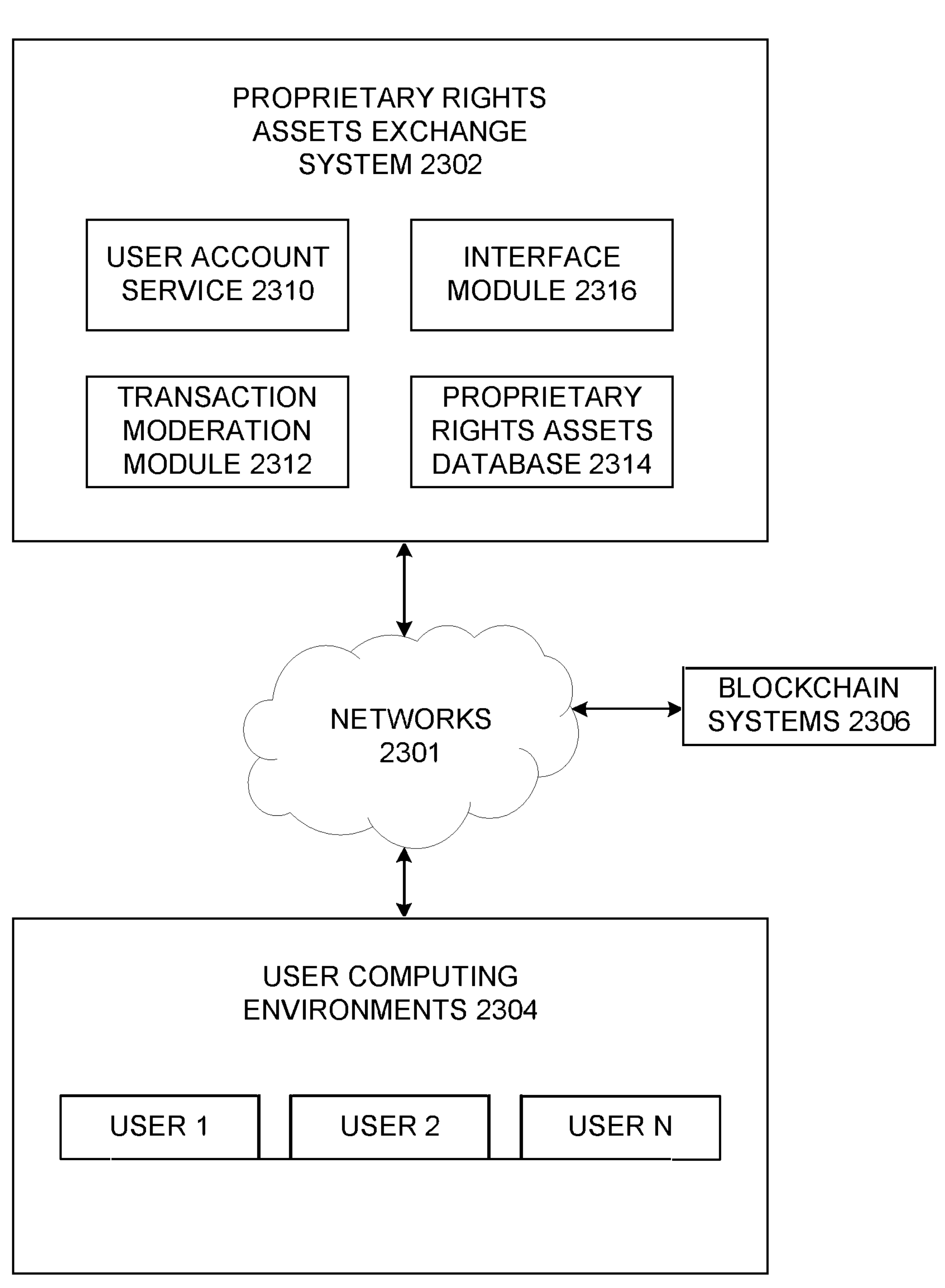
FIG. 23 is a block diagram of a production environment including a proprietary rights exchange system, according to an embodiment.

FIG. 23 illustrates a block diagram of a production environment 2300 for facilitating the exchange of proprietary rights assets, according to one embodiment. Embodiments of the present disclosure provide a proprietary rights exchange system. The proprietary rights assets exchange system enables users to buy and sell interest in proprietary rights assets utilizing blockchain technology. A user may list the proprietary rights assets on the proprietary rights assets exchange system so that other users may buy an interest in the proprietary rights assets. The proprietary rights assets exchange system issues tokens that represent ownership of the proprietary rights assets. The user may buy the interest in the proprietary rights asset by exchanging cryptographic currency or tokens for the tokens that represent ownership of the proprietary rights asset. In this way, the users of the proprietary rights assets exchange system may buy and sell the interest in proprietary rights assets.

The disclosed computer methods and systems for facilitating the exchange of proprietary rights assets provide for significant improvements to the technical fields of electronic transactions, proprietary rights transactions, data processing, and user experience. The disclosed computer methods and systems for facilitating the exchange of proprietary rights assets provide for the processing and storage of smaller amounts of data, i.e., more efficiently enabling the buying and selling of proprietary rights assets, thereby eliminating unnecessary data analysis and storage. Consequently, using the disclosed computer methods and systems for facilitating the exchange of proprietary rights assets results in more efficient use of human and non-human resources. In turn, this results in fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the computer method and system for facilitating the exchange of proprietary rights assets.

In one embodiment, a proprietary rights assets exchange system 2302 is implemented in the production environment 2300. The proprietary rights assets exchange system 2302 enables users to exchange proprietary rights assets. The proprietary rights assets exchange system 2302 records proprietary rights assets exchanges in one or more blockchains to ensure the security and efficiency of transactions.

In one embodiment, the production environment 2300 also includes user computing environments 2304 and blockchain systems 2306. The proprietary rights assets exchange system 2302, the user computing environments 2304, and the blockchain systems 2306 are connected by one or more networks 2301. The networks 2301 may include one or more of the Internet, satellite communication networks, cellular communication networks, wireless area networks, local area networks, or other types of networks that may enable computing systems to communicate with each other.

In one embodiment, the user computing environments 2304 correspond to computing environments by which the users of the proprietary rights assets exchange system 2302 access the proprietary rights assets exchange system 2302. The user of the proprietary rights assets exchange system 2302 may utilize one or more of a laptop computer, a tablet, a desktop computer, a smartphone, a wearable smart device, a personal electronic assistant, or other types of computing devices that may communicate with the proprietary rights assets exchange system 2302. Accordingly, the user computing environments 2304 may include any computing devices or computing systems by which individuals or organizations access the proprietary rights assets exchange system 2302. Thus, the user computing environments 2304 include a large number of computing environments by which individual users or organizations access the proprietary rights assets exchange system 2302.

In one embodiment, the user of the proprietary rights assets exchange system 2302 may include an individual, multiple individuals, or an organization. A single individual may create an account with the proprietary rights assets exchange system 2302 in order to list the proprietary rights assets for others to obtain an interest in, and/or to view the proprietary rights assets listed by other users. The user may include a group of individuals that have an account by which they may enable others to obtain an interest in their proprietary rights assets and by which they may attain interest in the proprietary rights assets of others that have listed their proprietary rights assets on the proprietary rights assets exchange system 2302. The user may also include an organization that has an account with the proprietary rights assets exchange system 2302 by which the organization may enable others to obtain an interest in its proprietary rights assets and by which the organization may attain interest in the proprietary rights assets of others that have listed their proprietary rights assets on the proprietary rights assets exchange system 2302.

In one embodiment, the proprietary rights assets exchange system 2302 utilizes an interface module 2316 to enable communication with the users of the proprietary rights assets exchange system 2302. The user may access the proprietary rights assets exchange system 2302 via the user computing environments 2304. The interface module 2316 may provide one or more graphical user interface(s) to the user. The graphical user interface may enable the user to navigate through menus, options, and services provided by the proprietary rights assets exchange system 2302.

In one embodiment, the proprietary rights assets exchange system 2302 uses an user account service 2310 to establish and maintain user accounts with the proprietary rights assets exchange system 2302. When the individual or the organization wishes to establish an account with the proprietary rights assets exchange system 2302, the user first accesses the proprietary rights assets exchange system 2302 via a computing device of the user. The interface module 2316 provides an interface that enables the user to either log in to the proprietary rights assets exchange system 2302, or to create an account with the proprietary rights assets exchange system 2302. The user may create an account with the proprietary rights assets exchange system 2302. When the user creates an account with the proprietary rights assets exchange system 2302, the interface module 2316 may guide the user through the process of creating an account by requesting personal information from the user, or by prompting the user to select a user name and a password.

In one embodiment, the user account service 2310 receives the registration information of the user from the interface module 2316. The user account service 2310 establishes the user's account with the proprietary rights assets exchange system 2302. When the user account service 2310 has established the account of the user, the user may then utilize the services of the proprietary rights assets exchange system 2302.

In one embodiment, the user account service 2310 includes a database of all user accounts. The database may include, for each user, login credentials, personal information, payment information, contact information, or other types of data that may be associated with the account of the user of the proprietary rights assets exchange system 2302.

In one embodiment, the user account service 2310 may link one or more payments accounts of the user to the proprietary rights assets exchange system 2302. For example, the user account service 2310 may link one or more cryptographic currency wallets of the user to the user's account with the proprietary rights assets exchange system 2302. The proprietary rights assets exchange system 2302 may then prompt the user to utilize one of the linked wallets when making a transaction to obtain an interest in the proprietary rights asset.

In one embodiment, the proprietary rights assets exchange system 2302 enables users to listed proprietary rights assets for exchange on the proprietary rights assets exchange system 2302. When the user wishes to list the proprietary rights asset on the proprietary rights assets exchange system 2302, the user may upload summary information of the proprietary rights asset. The user may also upload a copy of the proprietary rights asset. The user may determine how many proprietary rights assets exchange system 2302 tokens to issue for the proprietary rights asset. Other users of the proprietary rights assets exchange system 2302 may view the proprietary rights asset, or the summary information about the proprietary rights asset, and may obtain an interest in the proprietary rights asset by exchanging cryptographic currency for a portion of the tokens issued for the proprietary rights asset. Possession of the tokens represents an interest, such as partial or full ownership, of the proprietary rights asset. Additionally or alternatively, other users may exchange the proprietary rights assets exchange system 2302 tokens to obtain an interest in the proprietary rights asset listed by the user, as will be set forth in more detail below.

In one embodiment, the proprietary rights asset includes a proprietary rights asset. The proprietary rights asset may include a patent asset, a trademark asset, or copyright asset. In one embodiment, the patent asset may include an issued patent. In one embodiment, the patent asset may include a published patent application. In one embodiment, the patent asset may include a patent application. In one embodiment, the patent asset may include a provisional patent application. In one embodiment, the patent asset may include a description of an invention for which a patent application has not yet been filed.

In one embodiment, obtaining an interest in a listed patent asset may include obtaining full or partial ownership of the listed patent asset. In another embodiment, obtaining an interest in the listed patent asset may include obtaining a license to practice the claimed subject matter of the listed patent asset. Additionally or alternatively, obtaining an interest in the listed patent asset may include obtaining ownership of any patents that issue from the listed patent asset, when the listed patent asset includes a patent application that has not issued or when the listed patent asset includes a description of the invention for which a patent application has not yet been filed.

Users may list bundles, or portfolios, of patent assets on the proprietary rights assets exchange system 2302. The proprietary rights assets exchange system 2302 may issue tokens that correspond to an interest in the entire portfolio. Thus, in one example, if a listed bundle or portfolio of patent assets includes multiple issued patents, then the tokens may represent a partial ownership of each of the issued patents.

In one embodiment, the proprietary rights assets exchange system 2302 utilizes the transaction moderation module 2312 to execute transactions for exchanging tokens issued by the proprietary rights assets exchange system 2302. For example, if a first user has listed a proprietary rights asset for exchange, a second user may view the proprietary rights asset and may elect to obtain tokens representing an interest in the proprietary rights asset. The second user may exchange a selected amount of a cryptographic currency or proprietary rights assets exchange system 2302 tokens for a corresponding number of the tokens representing the proprietary rights asset, in accordance with an exchange rate. The transaction moderation module 2312 executes the transaction. When the transaction moderation module 2312 executes the transaction, the cryptographic currency is transferred to a wallet of the first user and the tokens representing the proprietary rights asset are transferred to a wall of the second user.

In one embodiment, one transaction moderation module 2312 executes the transaction, while the proprietary rights assets exchange system 2302 communicates with the one or more blockchain systems 2306. The transactions are executed by the one or more blockchain systems 2306. In other words, the transactions are recorded in one or more blockchains.

In one embodiment, when the user exchanges a cryptographic currency, such as Bitcoin or Ethereum or the proprietary rights assets exchange system 2302 tokens representing a proprietary rights asset, the blockchain systems 2306 record transactions transferring the cryptographic currency from a blockchain wallet of the second user to a blockchain wallet of the first user on one or more cryptographic currency blockchains. In one embodiment, the blockchain systems 2306 also record the transaction in one or more blockchains representing the proprietary rights assets exchange system 2302 tokens. The blockchains recorded the transaction indicating that tokens representing the proprietary rights asset have been transferred from the first user to the second user. If the second user exchanges proprietary rights assets exchange system 2302 tokens for the tokens representing the proprietary rights asset, then the blockchain systems 2306 record the transactions transferring certain tokens from the second user to the first user and transferring the tokens representing the proprietary rights asset from the first user to the second user.

In one embodiment, each user of the proprietary rights assets exchange system 2302 has a user account wallet. The user account wallet indicates the tokens currently possessed by the user in accordance with the one or more blockchains representing transactions for the tokens of the proprietary rights assets exchange system 2302. The user account wallet may also be linked to blockchain wallets of the user so that the user may exchange cryptographic currency from the user blockchain wallets or exchange tokens of the proprietary rights assets exchange system 2302, and so that the user may receive cryptographic currency from other users in exchange for tokens owned by the user.

In one embodiment, the user account wallet corresponds to a memory address that the user has with the proprietary rights assets exchange system 2302. In one embodiment, the linked blockchain wallet corresponds to transaction wallet memory addresses associated with the cryptographic currency system with which the user has an account.

In one embodiment, the proprietary rights assets exchange system 2302 includes a proprietary rights assets database 2314. The proprietary rights assets database 2314 includes proprietary rights assets currently listed for exchange in the proprietary rights assets exchange system 2302. Users may search through the proprietary rights assets database 2314 for the proprietary rights assets in which the users may like to obtain an interest. The proprietary rights assets database 2314 may also include the proprietary rights assets that are not currently available for exchange because all of the available tokens have already been exchanged.

Figure 24:
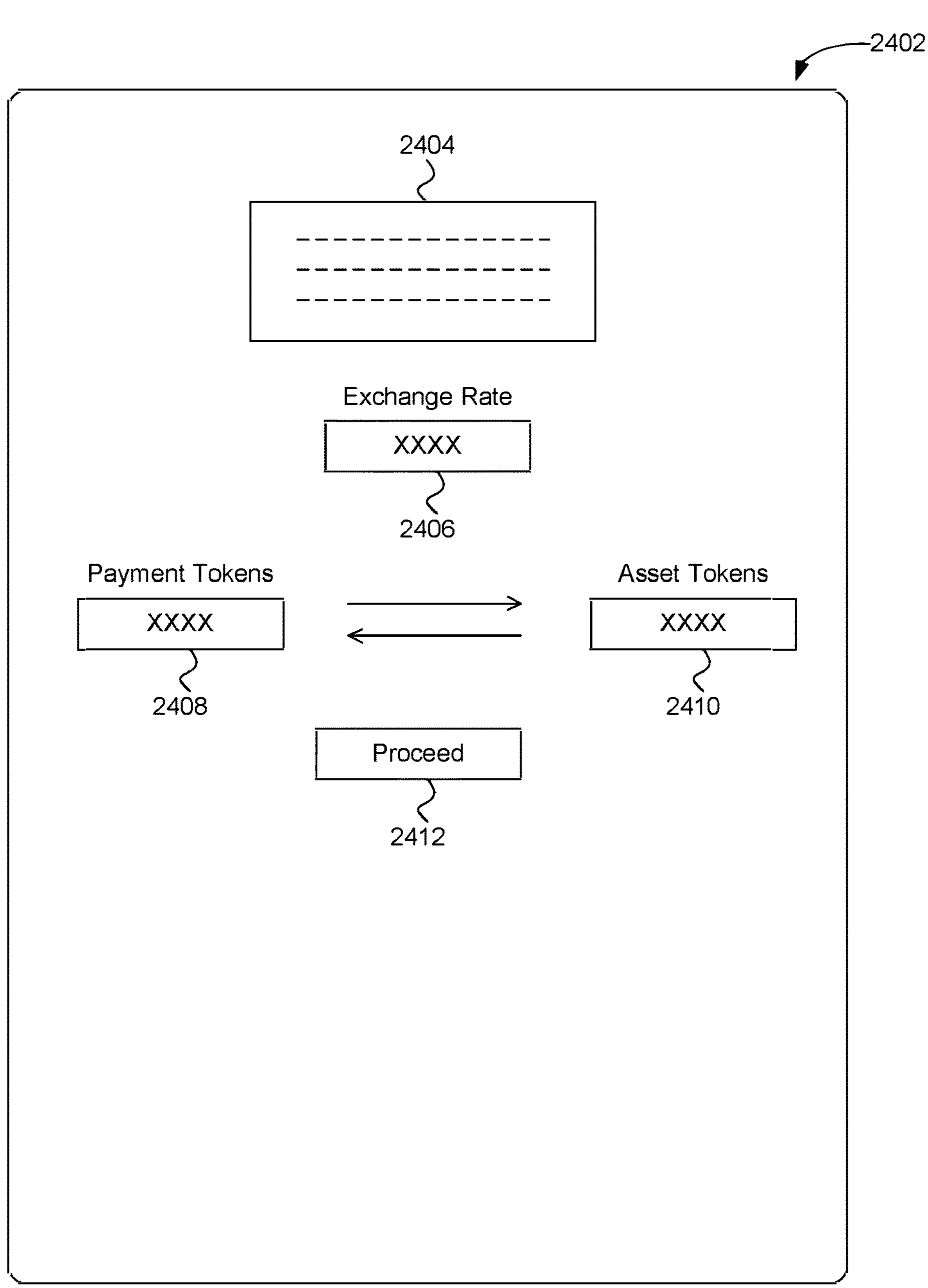
FIG. 24 is an illustration of a graphical user interface provided by a proprietary rights assets exchange screen, according to an embodiment.

FIG. 24 is an illustration of a screen of a graphical user interface 2402 presented on a computing device of a user of the proprietary rights assets exchange system 2302 of FIG. 23, according to one embodiment. In the example of FIG. 24, the graphical user interface 2402 includes a proprietary rights asset display field 2404, an exchange rate field 2406, a payment tokens field 2408, and a proprietary rights asset tokens field 2410.

In one embodiment, the graphical user interface 2402 displays descriptive data related to a proprietary rights asset in the proprietary rights asset display field 2404. The descriptive data may include a summary of the one or more proprietary rights assets, or the full text and figures of the proprietary rights asset.

In one embodiment, the user enters in a payment tokens field 2408 an amount of a cryptographic currency or an amount of proprietary rights assets exchange system 2302 tokens that the user wishes to exchange for tokens representing the proprietary rights asset displayed in the proprietary rights asset display field 2404. The payment tokens field 2408 may prompt the user to select a type of payment. The type of payment may include a type of cryptographic currency or proprietary rights asset tokens owned by the user. The user may select the payment type and may then enter the amount of the cryptographic currency or the proprietary rights asset tokens that the user may like to exchange for an interest in the proprietary rights asset.

In one embodiment, the exchange rate field 2406 displays an exchange rate of the payment type selected by the user and the proprietary rights asset tokens. If the user selects to pay with Bitcoin, the exchange rate field 2406 may display an exchange rate for the number of proprietary rights asset tokens per Bitcoin or per Satoshi. If the user selects to pay with proprietary rights asset tokens owned by the user, then the exchange rate field 2406 may display the number of first proprietary rights asset tokens per second proprietary rights asset token, where the second proprietary rights asset tokens are the proprietary rights asset tokens associated with the proprietary rights asset displayed in the proprietary rights asset display field 2404.

In one embodiment, when the user enters a payment amount in the payment tokens field 2408, the graphical user interface 2402 displays in the asset token field 2410 a number of the proprietary rights asset tokens that will be received by the user based on the exchange rate field 2406. In one embodiment, the number of proprietary rights asset tokens is generated based on the exchange rate and a fee received by the proprietary rights assets exchange system 2302. In one embodiment, the exchange rate field 2406 includes a fee charged by the proprietary rights assets exchange system 2302.

In one embodiment, after the user selects a type of payment, the user may enter a number of proprietary rights asset tokens into the proprietary rights asset tokens field 2410. The proprietary rights assets exchange system 2302 then determines an amount of the payment type that will need to be paid in exchange for the selected number of proprietary rights asset tokens entered into the proprietary rights asset tokens field 2410, based on the exchange rate.

In one embodiment, the graphical user interface 2402 includes a proceed button 2412. Once the user has entered a payment tokens amount or a proprietary rights asset tokens amount, the proceed button 2412 becomes active. The user may then click on the proceed button 2412 in order to proceed with the transaction. The user may enter additional screens to confirm the exchange. After the exchange has been confirmed, the proprietary rights assets exchange system 2302 and the blockchain systems 2306 execute the transaction.

As noted above, the specific illustrative examples discussed above are illustrative examples of implementations of embodiments of the computer method or process for facilitating the exchange of proprietary rights assets. Those of skill in the art will readily recognize that other implementations and embodiments are possible. Therefore, the discussion above should not be construed as a limitation on the claims provided below.

In one embodiment, a computer method for secure transfer of a blockchain token representing an interest in a proprietary rights asset, includes displaying at least summary information corresponding to a proprietary rights asset to a user on an electronic display according to a user interface and receiving, from the user via the user interface, an order to exchange a first quantity of cryptographic currency held by the user at a user wallet memory address for a second quantity of asset tokens representing at least a fractional interest in the proprietary rights asset. The computer method includes writing data corresponding to a pending transfer of the second quantity of asset tokens to the user wallet memory address and receiving data corresponding to the first quantity of cryptographic currency into a transaction wallet memory address.

Figure 25:
FIG. 25 is an illustration of a computer system, according to an embodiment.
Figure 25:
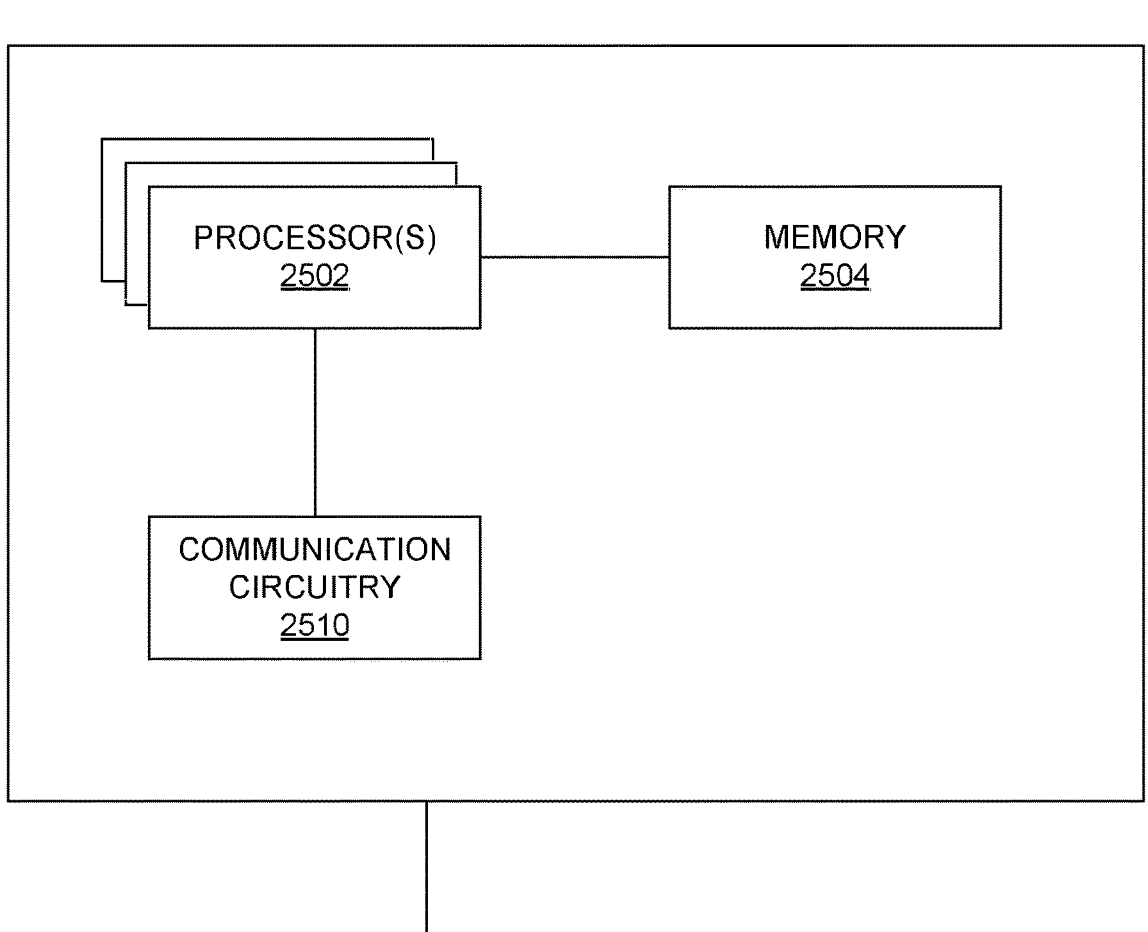

In one embodiment, as illustrated in FIG. 25, a system 2500 for facilitating the exchange of proprietary rights assets includes at least one processor 2502 and at least one memory 2504 coupled to the at least one processor 2502. The at least one memory 2504 has stored instructions therein which, when executed by any set of the one or more processors 2502, perform a process. The process includes displaying at least summary information corresponding to a proprietary rights asset to a user on an electronic display 2506 according to a user interface 2508 provided by the system 2500 to the electronic display 2506, and receiving, from the user via the user interface 2508, an order to exchange a first quantity of cryptographic currency held by the user at a user wallet memory address for a second quantity of proprietary rights asset tokens representing at least a fractional interest in the proprietary rights asset. The display 2506 may be remote from the system 2500. For example, the system 2500 may be disposed in, e.g., a data center, whereas the display 2506 viewed by the user may be associated with a tablet, phone, laptop computer, desktop, computer, computer kiosk, or the like. The user interface 2508 may include a graphical user interface (GUI), such as but not limited to a mobile app, a web page or the like, communicated from the system 2500 via communication circuitry 2510 for presentation on the display 2506 and configured to receive input from a touch screen, keyboard, mouse stylus or other input means configured to interact with the displayed GUI.

The process includes writing data corresponding to a pending transfer of the second quantity of proprietary rights asset tokens to the user wallet memory address and receiving data corresponding to the first quantity of cryptographic currency into a transaction wallet memory address.

In one embodiment, a computing system implemented method includes displaying at least summary information corresponding to a proprietary rights asset to a first user on an electronic display according to a user interface and receiving, from the first user via the user interface, an order to exchange a first quantity of cryptographic currency held by the first user for a second quantity of asset tokens held by a second user and representing at least a fractional interest in the proprietary rights asset. The computer method includes transferring the first quantity of cryptographic currency to the second user, transferring the second quantity of asset tokens to the first user, and recording the transfer of the second quantity of cryptographic currency in one or more blockchains. Transferring the second quantity of asset tokens may correspond to transferring the at least fractional interest in the proprietary rights asset to the first user. The first quantity of cryptographic currency may include a first quantity of asset tokens representing at least a fractional interest in a second proprietary rights asset. Transferring the first quantity of cryptographic currency may include transferring the at least fractional interest in the second proprietary rights asset to the second user. The proprietary rights asset may be a patent asset including one or more of an issued patent, a pending patent application, or a description of an innovation.

In one embodiment, a system for facilitating the exchange of proprietary rights assets includes at least one processor and at least one memory coupled to the at least one processor. The at least one memory has stored instructions therein which, when executed by any set of the one or more processors, perform a process. The process includes displaying at least summary information corresponding to a proprietary rights asset to a first user on an electronic display according to a user interface and receiving, from the first user via the user interface, an order to exchange a first quantity of cryptographic currency held by the first user for a second quantity of asset tokens held by a second user and representing at least a fractional interest in the proprietary rights asset. The process includes transferring the first quantity of cryptographic currency to the second user, transferring the second quantity of asset tokens to the first user, and recording the transfer of the second quantity of cryptographic currency in one or more blockchains.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A computer method for distributing a cost of enforcing a proprietary rights asset, comprising:

presenting at least summary information about a proprietary rights asset on an electronic display, wherein the proprietary rights asset is an intangible proprietary rights asset;

offering, on the electronic display, at least fractional ownership of the proprietary rights asset in the form of a proprietary rights asset blockchain token;

displaying an allocation of funds received in exchange for the proprietary rights asset blockchain token, including an allocation for future enforcement of proprietary rights corresponding to the proprietary rights asset on the electronic display;

receiving an order to exchange a cryptographic currency value for the proprietary rights asset blockchain token;

performing the exchange;

transferring the allocated funds to an enforcement account;

receiving a report from a user holding the proprietary rights asset blockchain token, the report indicating a need for enforcement of the proprietary rights asset;

transmitting data corresponding to the report to other users holding other proprietary rights asset blockchain tokens for the proprietary rights asset;

receiving verification from a plurality of the other users that there is a need for enforcement; and contracting with an enforcement agent to enforce the proprietary rights asset.

2. The computer method of claim 1, wherein the proprietary rights asset corresponds to a patent enforceable in at least one country.

3. The computer method of claim 2, wherein transferring the allocated funds to the enforcement account includes swapping the allocated cryptographic currency value for a corresponding value of fiat currency of the at least one country.

4. A computer method for maintaining an allocation of funds for enforcing an intellectual property (IP) asset, comprising:

establishing a target amount of enforcement funding across a population of blockchain tokens representing one or more proprietary rights assets, wherein the one or more proprietary rights assets are intangible proprietary rights assets;

apportioning a fractional portion of the enforcement funding to each blockchain token;

displaying, on a graphical user interface (GUI), the enforcement funding corresponding to a token or the population of tokens;

receiving a verified request, from a user via the GUI, to swap a cryptographic currency for a proprietary rights asset blockchain token;

making the swap;

displaying the user cryptographic currency and proprietary rights asset blockchain token balance in the GUI;

determining if the net number of sold blockchain tokens has changed;

adjusting the amount of enforcement funding in an enforcement escrow account for the population to compensate for any change in the net number of sold blockchain tokens;

displaying an escrow account balance per token or population of tokens on the GUI;

receiving, via the GUI, a report from a user holding one or more blockchain tokens of a need for enforcement of the proprietary rights asset;

transmitting data corresponding to the report to other users holding blockchain tokens corresponding to the proprietary rights asset;

receiving, via the GUI, verification from a plurality of the other users that there is a need for enforcement; and contracting with an enforcement agent to enforce the proprietary rights asset.

5. The computer method of claim 4, wherein the enforcement funding is held in a fiat currency.

6. The computer method of claim 5, wherein adjusting the amount of enforcement funding comprises converting a number of cryptographic currency into the fiat currency and depositing the fiat currency into an electronic escrow account.

7. The computer method of claim 4, wherein the enforcement funding is held in a fiat currency; and wherein adjusting the amount of enforcement funding comprises withdrawing an amount of fiat currency from the escrow account and converting the withdrawn fiat currency into cryptographic currency.

8. A system for distributing a cost of enforcing a proprietary rights asset comprising:

a processor; and a memory coupled to the processor, the memory having instructions stored therein that when executed cause the processor to:

present at least summary information about a proprietary rights asset on an electronic display, wherein the proprietary rights asset is an intangible proprietary rights asset;

offer, on the electronic display, at least fractional ownership of the proprietary rights asset in the form of a proprietary rights asset blockchain token;

display an allocation of funds received in exchange for the proprietary rights asset blockchain token, including an allocation for future enforcement of proprietary rights corresponding to the proprietary rights asset on the electronic display;

receive an order to exchange a cryptographic currency value for the proprietary rights asset blockchain token;

perform the exchange;

transfer the allocated funds to an enforcement account;

receive a report from a user holding the proprietary rights asset blockchain token, the report indicating a need for enforcement of the proprietary rights asset;

transmit data corresponding to the report to other users holding other proprietary rights asset blockchain tokens for the proprietary rights asset;

receive verification from a plurality of the other users that there is a need for enforcement; and contract with an enforcement agent to enforce the proprietary rights asset.

9. The system of claim 8, wherein the proprietary rights asset corresponds to a patent enforceable in at least one country.

10. The system of claim 9, wherein transferring the allocated funds to the enforcement account includes swapping the allocated cryptographic currency value for a corresponding value of fiat currency of the at least one country.

11. A system for maintaining an allocation of funds for enforcing an intellectual property (IP) asset comprising:

a processor; and a memory coupled to the processor, the memory having instructions stored therein that when executed cause the processor to:

establish a target amount of enforcement funding across a population of blockchain tokens representing one or more proprietary rights assets, wherein the one or more proprietary rights assets are intangible proprietary rights assets;

apportion a fractional portion of the enforcement funding to each blockchain token;

display, on a graphical user interface (GUI), the enforcement funding corresponding to a token or the population of tokens;

receive a verified request, from a user via the GUI, to swap a cryptographic currency for a proprietary rights asset blockchain token;

making the swap;

display the user cryptographic currency and proprietary rights asset blockchain token balance in the GUI;

determine if the net number of sold blockchain tokens has changed;

adjust the amount of enforcement funding in an enforcement escrow account for the population to compensate for any change in the net number of sold blockchain tokens;

display an escrow account balance per token or population of tokens on the GUI;

receive, via the GUI, a report from a user holding one or more blockchain tokens of a need for enforcement of the proprietary rights asset;

transmit data corresponding to the report to other users holding blockchain tokens corresponding to the proprietary rights asset;

receive, via the GUI, verification from a plurality of the other users that there is a need for enforcement; and contract with an enforcement agent to enforce the proprietary rights asset.

12. The system of claim 11, wherein the enforcement funding is held in a fiat currency.

13. The system of claim 12, wherein adjusting the amount of enforcement funding comprises converting a number of cryptographic currency into the fiat currency and depositing the fiat currency into an electronic escrow account.

14. The system of claim 11, wherein the enforcement funding is held in a fiat currency; and wherein adjusting the amount of enforcement funding comprises withdrawing an amount of fiat currency from the escrow account and converting the withdrawn fiat currency into cryptographic currency.

* * * * *